Oct. 18, 1938.   R. W. BROWN   2,133,279
PNEUMATIC SUSPENSION DEVICE
Filed Jan. 3, 1936   12 Sheets-Sheet 1

INVENTOR
Roy W. Brown
BY
Albert L. Ely
ATTORNEY

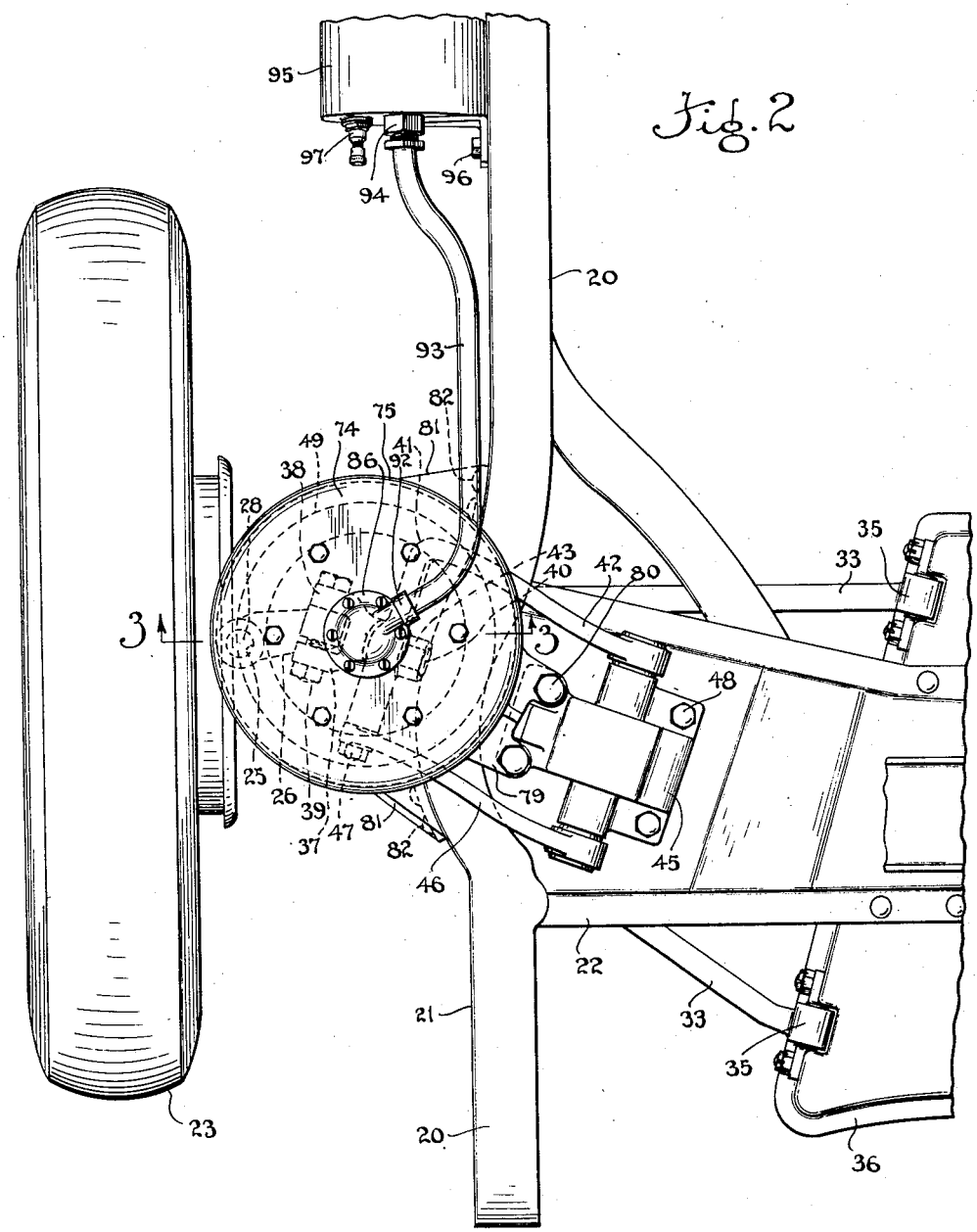

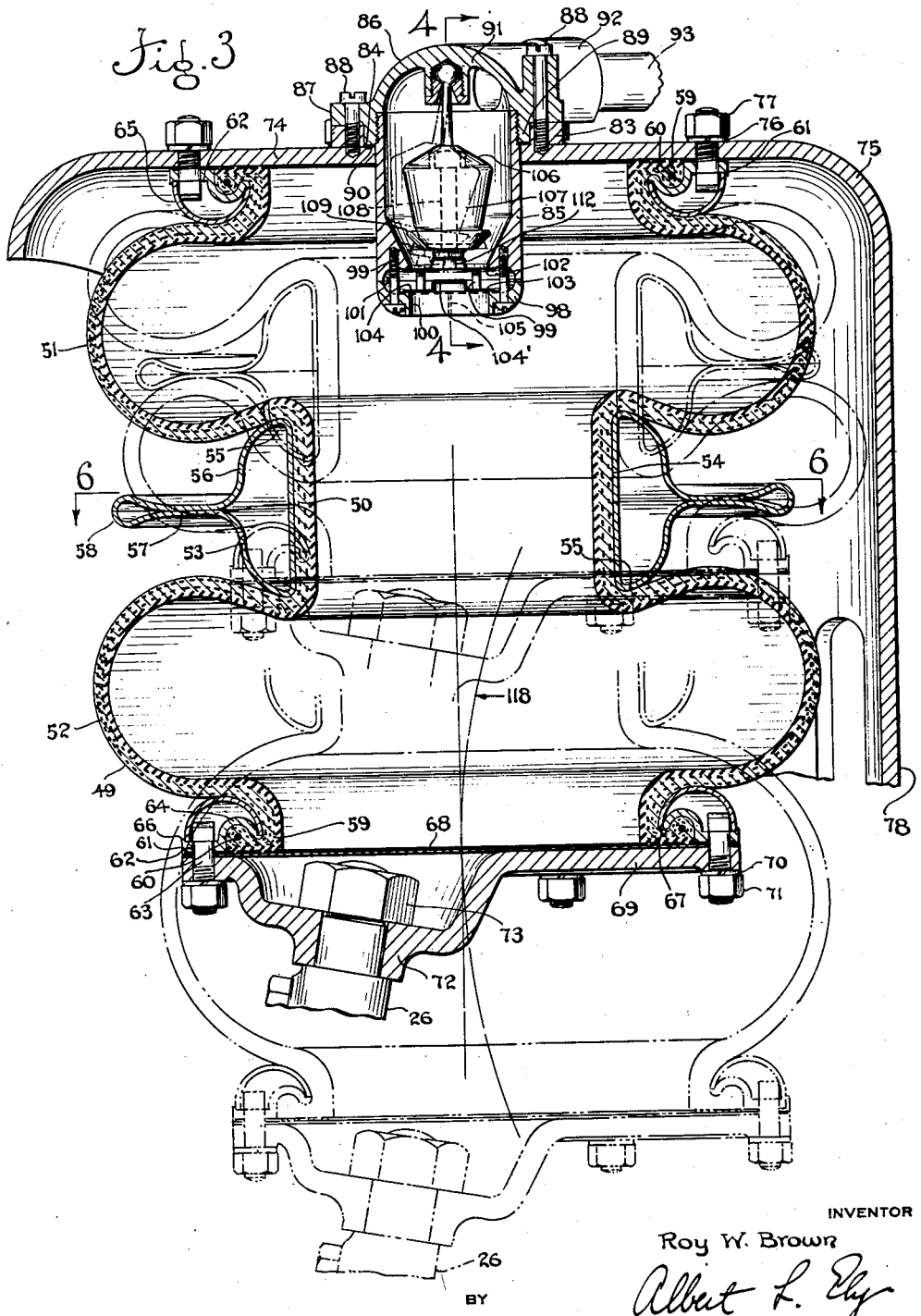

Oct. 18, 1938.    R. W. BROWN    2,133,279
PNEUMATIC SUSPENSION DEVICE
Filed Jan. 3, 1936    12 Sheets-Sheet 4
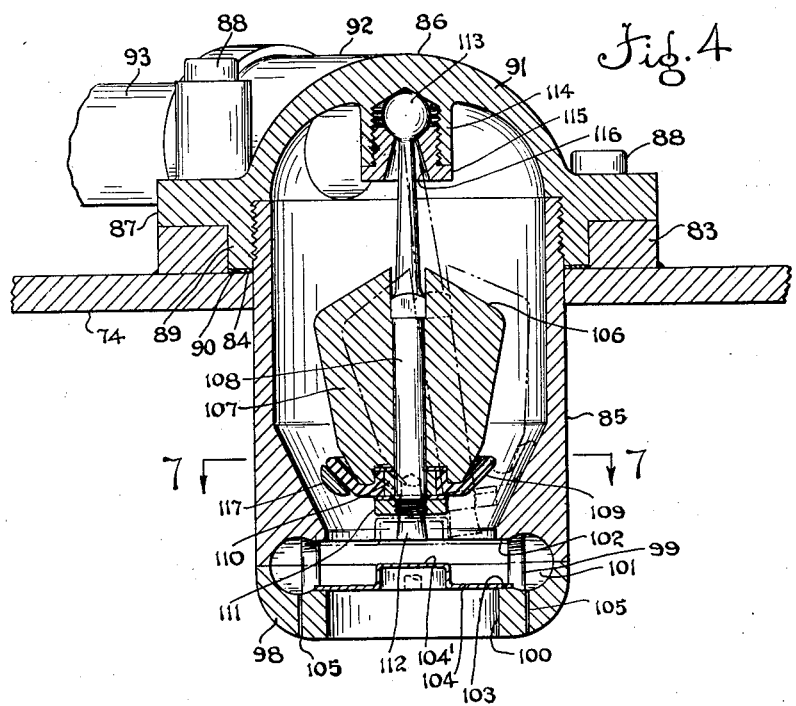
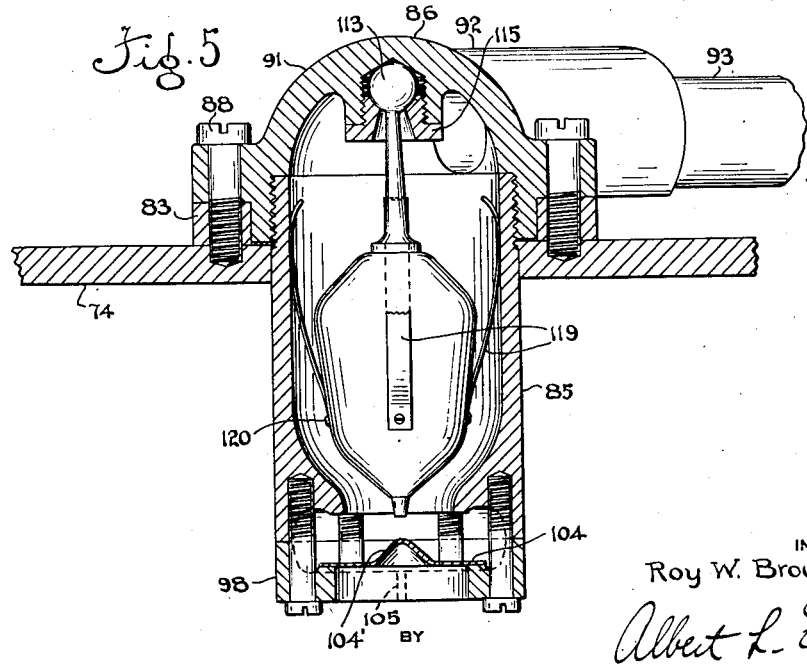
INVENTOR
Roy W. Brown
BY Albert L. Ely
ATTORNEY Oct. 18, 1938.  R. W. BROWN  2,133,279
PNEUMATIC SUSPENSION DEVICE
Filed Jan. 3, 1936  12 Sheets-Sheet 5
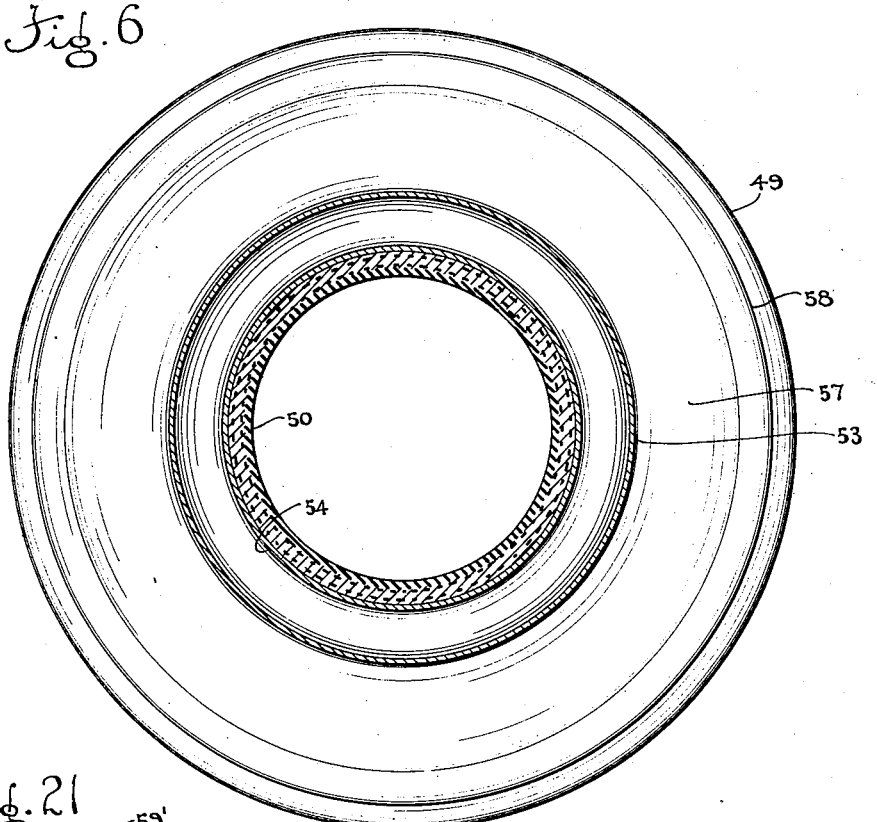
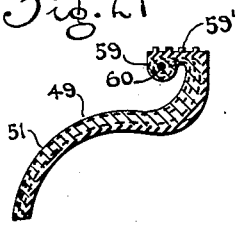
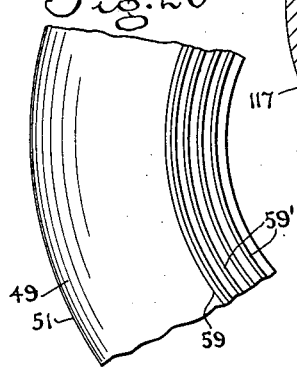
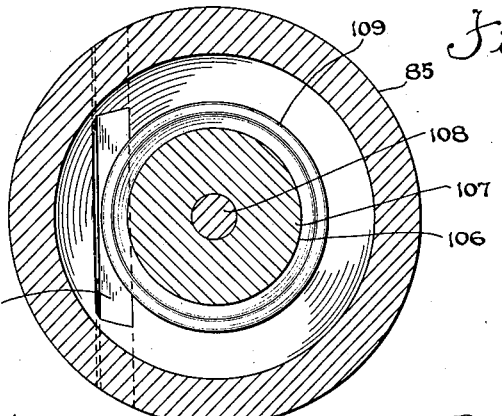
INVENTOR
Roy W. Brown
BY
Albert L. Ely
ATTORNEY

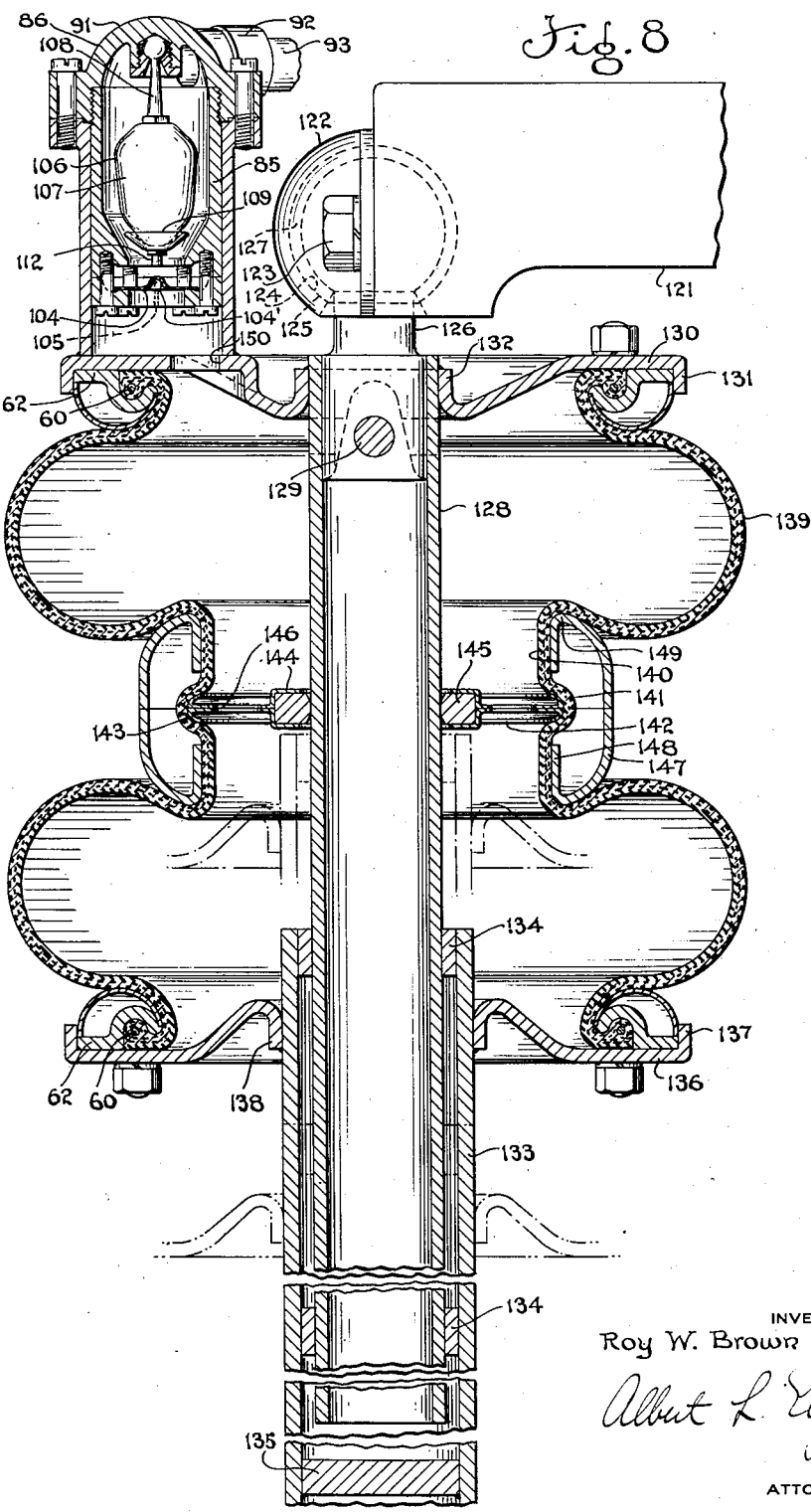

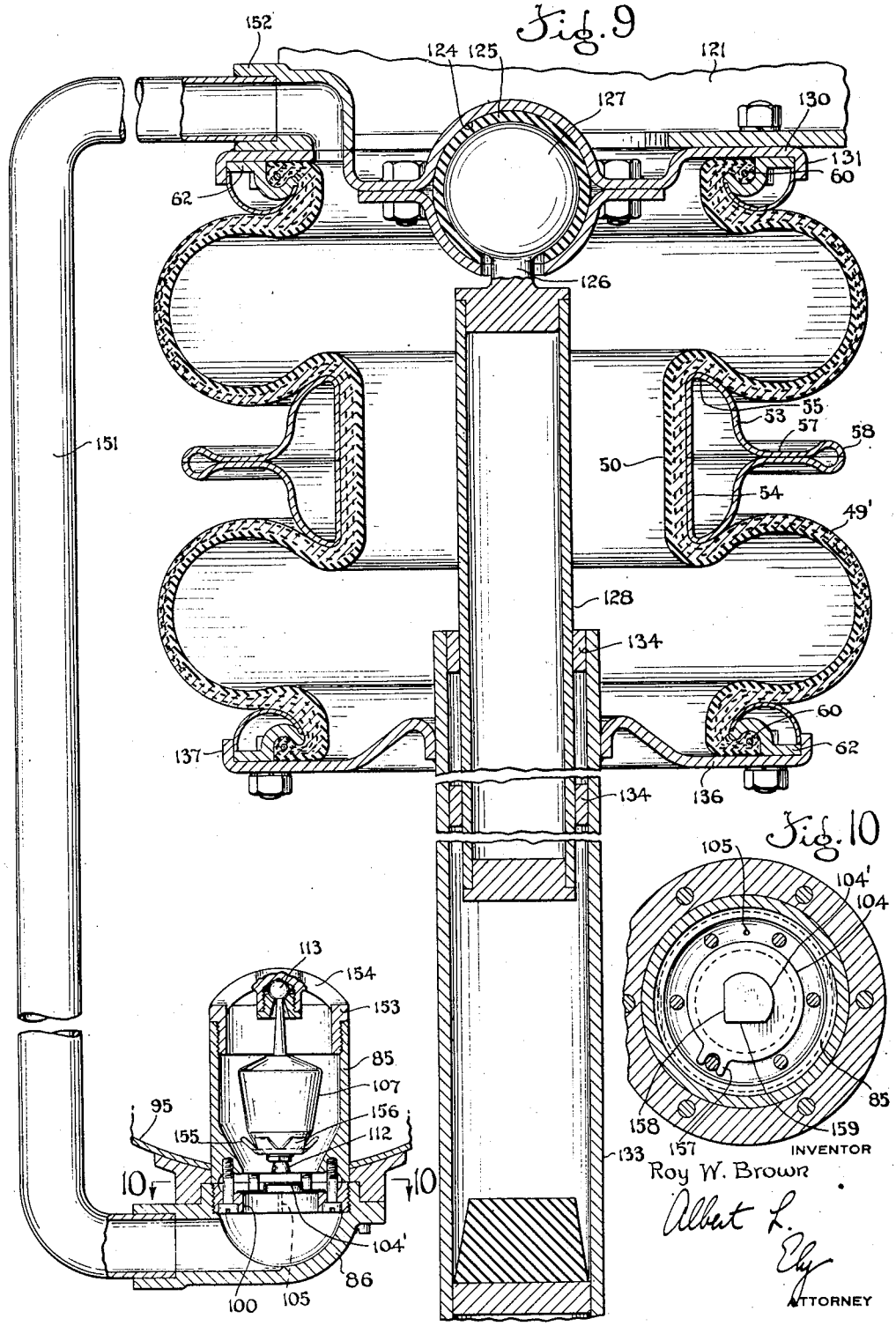
Oct. 18, 1938.  R. W. BROWN  2,133,279
PNEUMATIC SUSPENSION DEVICE
Filed Jan. 3, 1936  12 Sheets-Sheet 7
INVENTOR
Roy W. Brown
Albert L. Ely
ATTORNEY

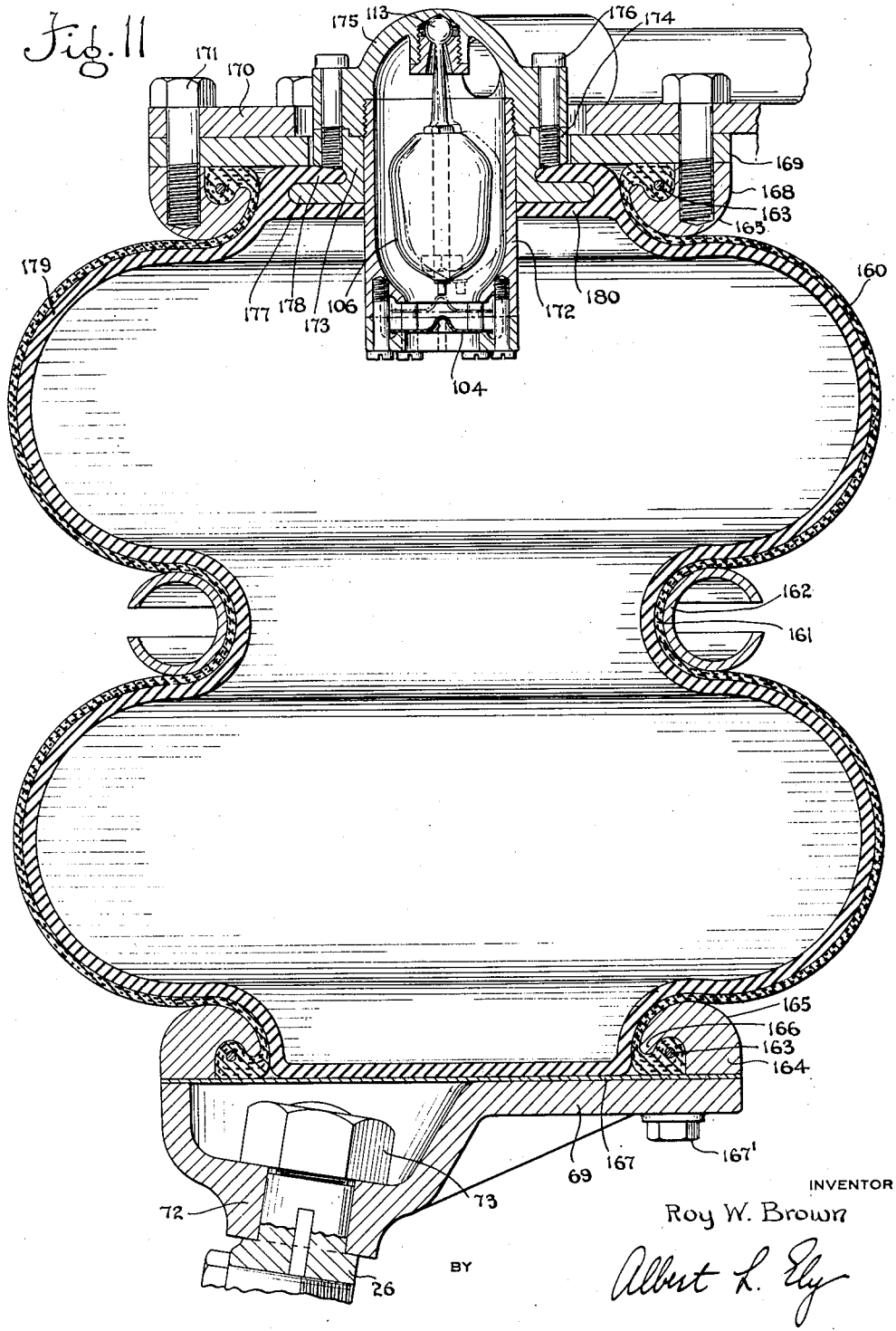

Oct. 18, 1938.  R. W. BROWN  2,133,279
PNEUMATIC SUSPENSION DEVICE
Filed Jan. 3, 1936  12 Sheets-Sheet 9
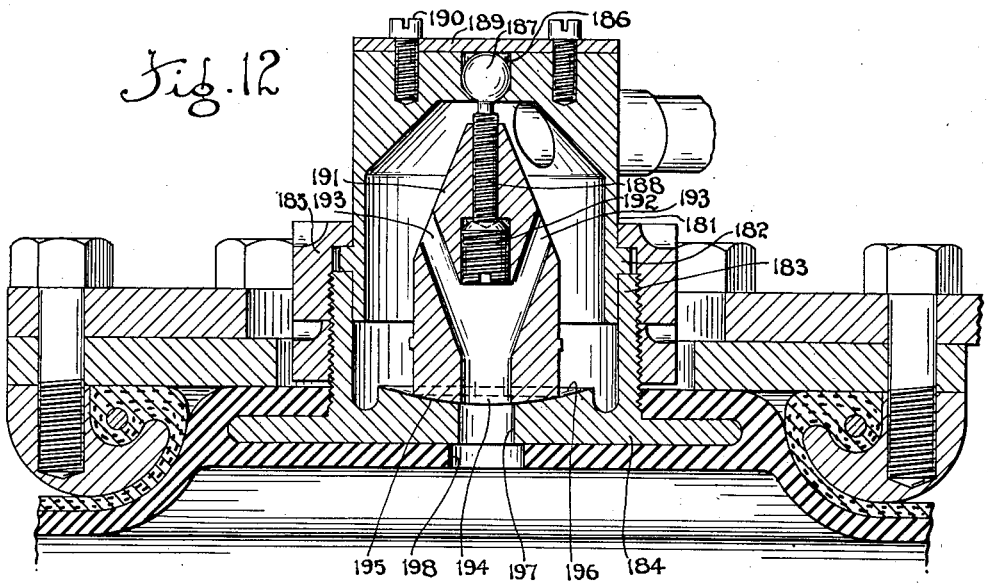
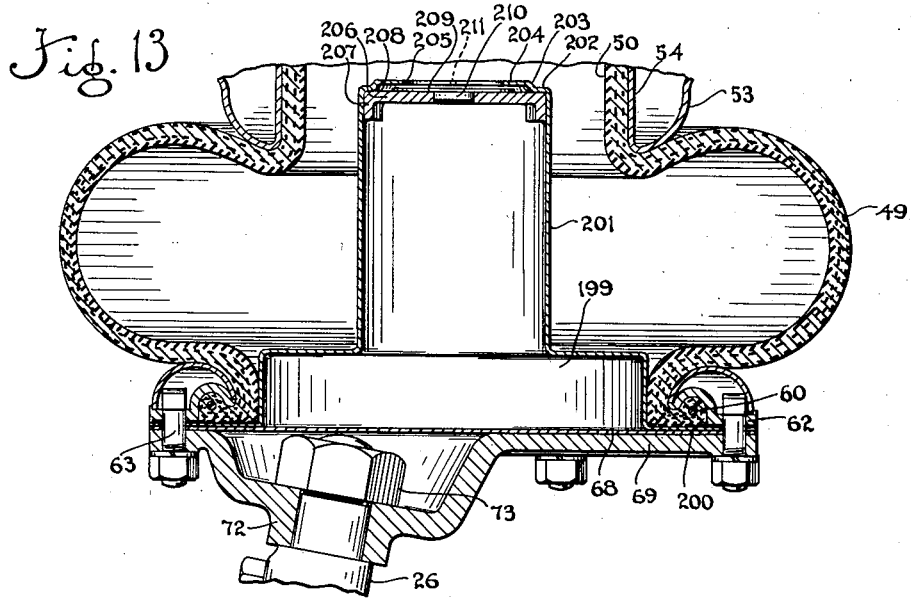
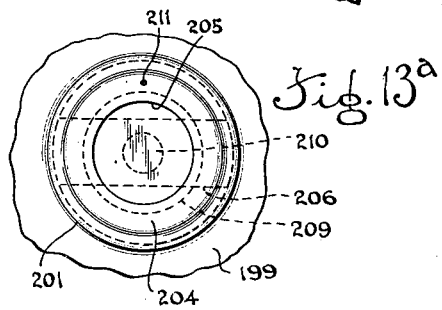
INVENTOR
Roy W. Brown
BY
Albert L. Ely
ATTORNEY Oct. 18, 1938.　　　　R. W. BROWN　　　　2,133,279
PNEUMATIC SUSPENSION DEVICE
Filed Jan. 3, 1936　　　　12 Sheets-Sheet 10

INVENTOR
Roy W. Brown
BY Albert L. Ely
ATTORNEY

Patented Oct. 18, 1938

2,133,279

UNITED STATES PATENT OFFICE 2,133,279

PNEUMATIC SUSPENSION DEVICE

Roy W. Brown, Akron, Ohio

Application January 3, 1936, Serial No. 57,355

54 Claims. (Cl. 267—15)

This invention relates to improvements in pneumatic suspension devices of a type particularly adapted for use on vehicles and has for its primary object to provide such a device which is simple in construction, inexpensive to manufacture and efficient in operation.

A further object of the present invention is to provide a new form of bellows mounted upon the vehicle to take the place of the standard metal spring at present employed, and to so mount the bellows without interference with the efficiency of the steering mechanism.

A further object of the present invention is to provide an expansible and compressible bellows of flexible material adapted to be connected with a reservoir for fluid under pressure to establish a normally balanced condition therebetween and adapted to absorb shocks caused from irregularities in the road without appreciably transmitting the same to the chassis.

Another object is to devise a construction wherein the bellows is so located between the chassis and the wheel as most effectively to oppose torque reactions resulting from horizontal accelerations.

A further object is to devise an automobile construction in which a pneumatic suspension device is combined with a wheel positioning mechanism for improving the riding qualities of the automobile.

Another object is to devise an automobile construction in which a pneumatic suspension device is combined with independent wheel suspension mechanism for improving the riding qualities of the automobile.

Still another object is to devise an automobile construction in which a pneumatic suspension device is combined with a parallelogram type of independent wheel suspension in such manner as to minimize the loading on the linkage.

A still further object of the invention is to provide improved means actuated by horizontal acceleration due to driving the vehicle around curves and from the application of brakes in checking the motion of the vehicle, which momentarily interrupts the communication between the bellows and the reservoir and results in a building up of the pressure within the bellows sufficiently to counteract the tendency for shifting of the forces due to horizontal acceleration, and which tends to dampen the same so that the reaction is materially lessened, thereby resulting in improved riding quality.

Another object is to devise a pneumatic suspension device comprising a bellows and supporting means therefor, wherein the shapes of supporting means and the bellows are such that as the bellows progressively contacts different areas of said supporting means during deflection of the bellows, the effective area "piston effect" of the latter will be changed to afford optimum riding qualities, the shape and size of the supporting means being capable of change to meet the individual requirements of load, rate and change of rate of different automobiles or of different riding qualities on the same automobile, without changing the bellows.

A further object is to devise a pneumatic suspension device comprising a low-rate bellows and supporting means therefor for stabilizing the bellows and supporting the central portion thereof against excessive angular and lateral displacement.

With the objects above indicated and other objects hereinafter explained in view, the invention consists in the construction and combination of elements hereinafter illustrated, described and claimed.

Referring to the drawings,

Figure 2 is a top plan view of the arrangement shown in Figure 1;

Figure 3 is a vertical sectional view taken on line 3—3 in Figure 2 and showing the preferred construction of the suspension device embodying the invention on an enlarged scale;

Figure 4 is a vertical sectional view taken on line 4—4 in Figure 3 and on an enlarged scale;

Figure 5 is a vertical sectional view similar to Figure 4 but showing a modification of the valve structure;

Figure 6 is a transverse sectional view taken on line 6—6 in Figure 3 and showing the bellows and center ring arrangement;

Figure 7 is a transverse sectional view taken on line 7—7 in Figure 4;

Figure 8 is a vertical sectional view of a modified suspension but emboyding the present invention;

Figure 9 is a vertical sectional view of a still further modification of the suspension embodying the present invention;

Figure 10 is a transverse sectional view taken on line 10—10 in Figure 9 and showing the details of the valve mechanism;

Figure 11 is a vertical sectional view of a modified form of suspension embodying the present invention;

Figure 12 is a fragmentary vertical sectional view of a still further modification of the valve structure;

Figure 13 is a fragmentary vertical sectional view showing the use of an additional or auxiliary tank or receptacle in the suspension;

Figure 14:
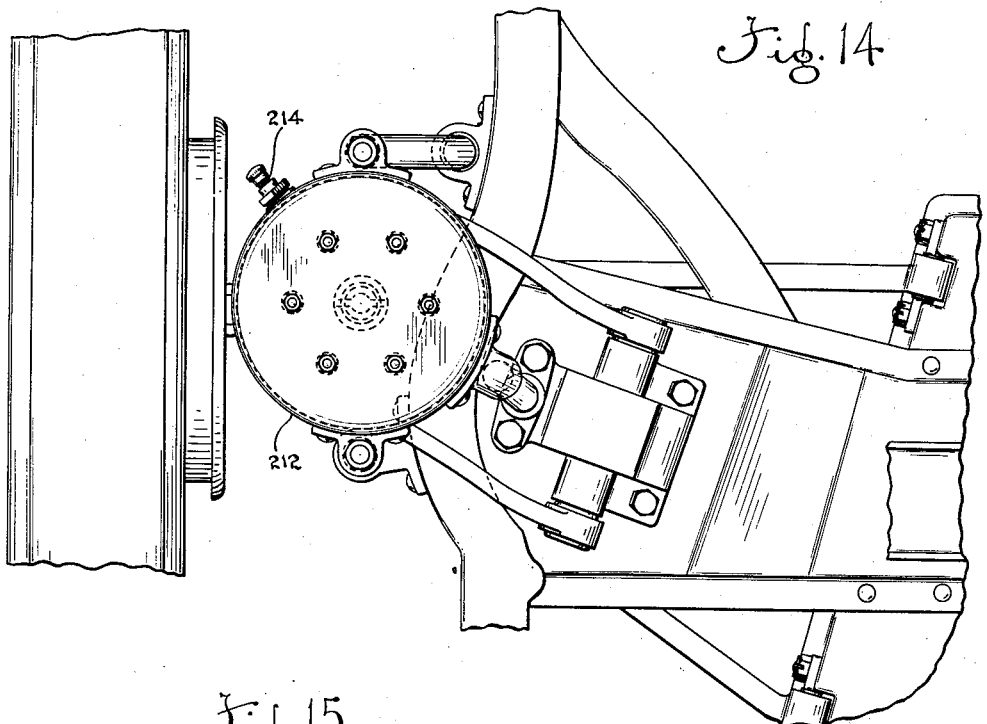
Figure 15:
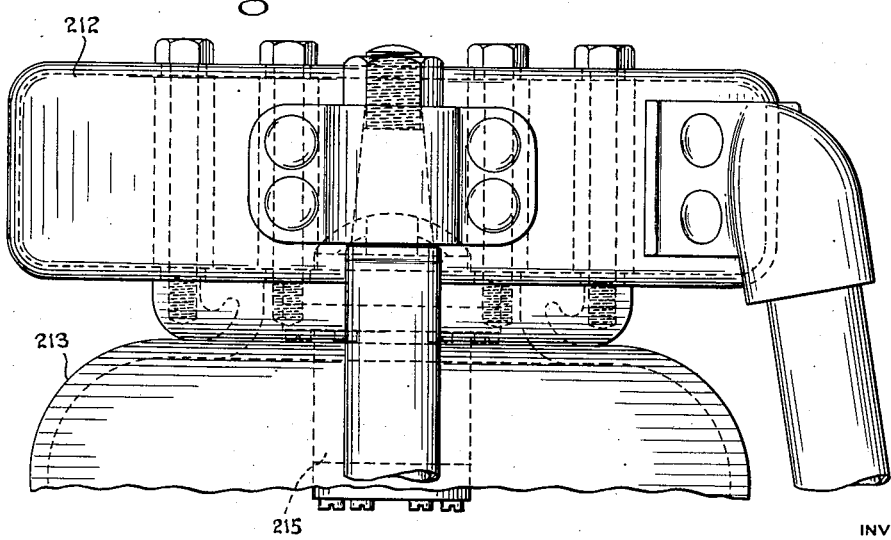
Figure 16:
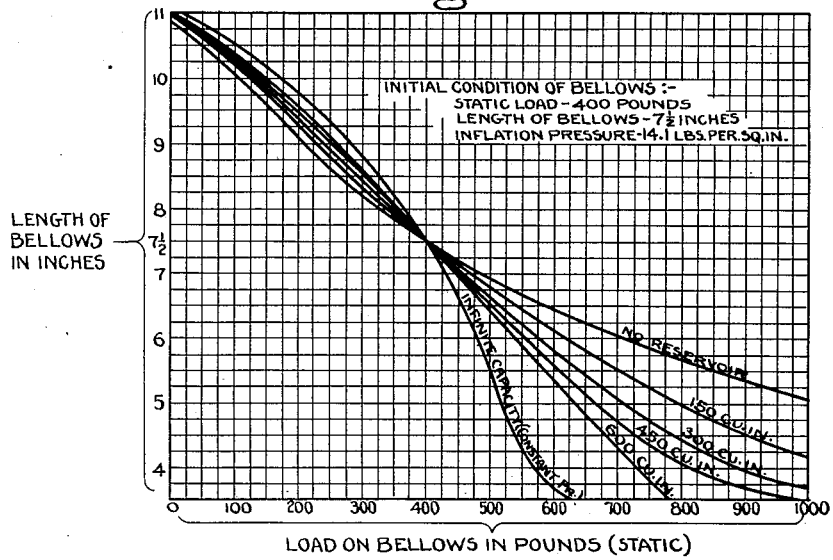
Figure 17:
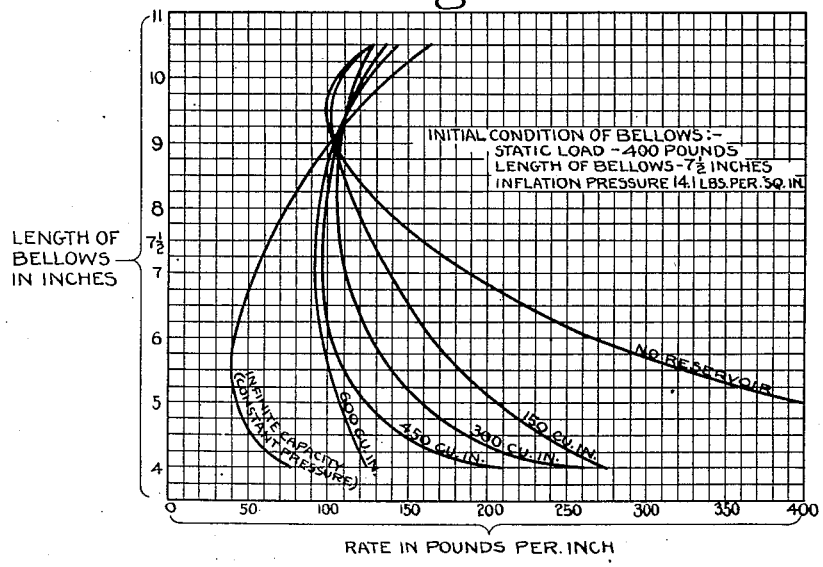
Figure 18:
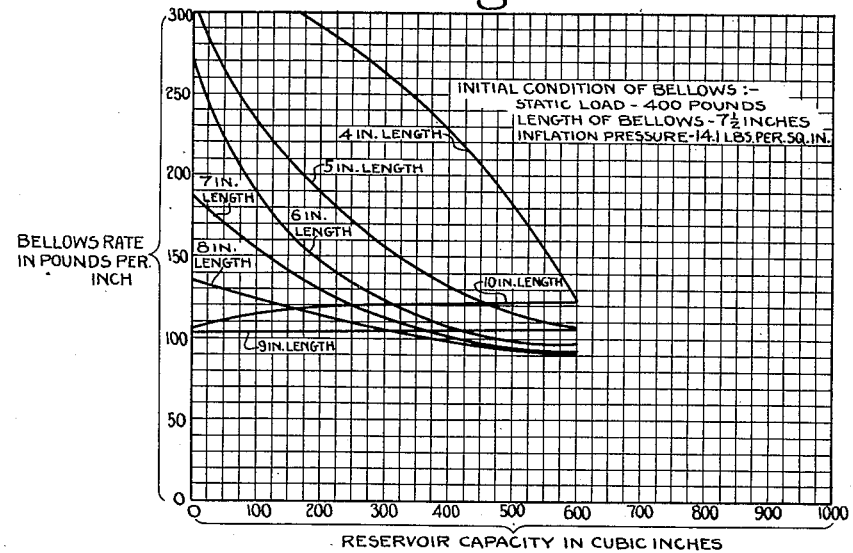
Figure 19:
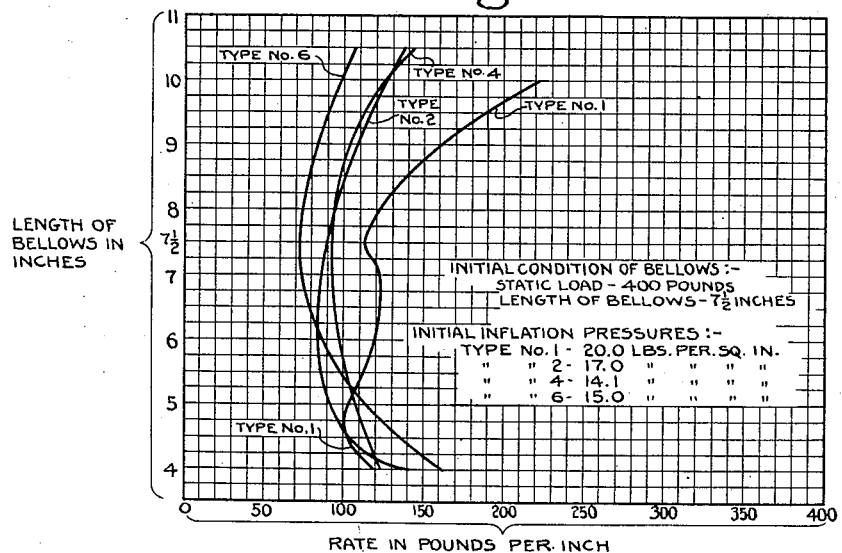

Figure 13ᵃ is a fragmentary top plan view of the tank shown in Figure 13;

Figure 14 is a fragmentary top plan view of a modified form of the suspension wherein the reservoir is attached to the top thereof;

Figure 15 is a front elevational view of that shown in Figure 14;

Figure 16 is a chart showing the static load on the bellows at different lengths;

Figure 17 is a chart showing the rate in pounds per inch at different bellows lengths;

Figure 18 is a chart showing the bellows rate for any selected reservoir capacity in cubic inches;

Figure 19 is a chart showing the characteristics of the four types of bellows shown in the drawings;

Figure 20 is a fragmentary end view of the bellows;

Figure 21 is a transverse sectional view thereof.

In the drawings, I have shown for purposes of exemplification a pneumatic suspension device embodying the present invention applied to a motor vehicle replacing the standard type of steel leaf or spiral coil spring, but it should be understood that the device is capable of adaptation for many other purposes, replacing elastic load-carrying or shock absorbing mechanisms, and the invention is not therefore to be limited in this respect.

Figure 1:
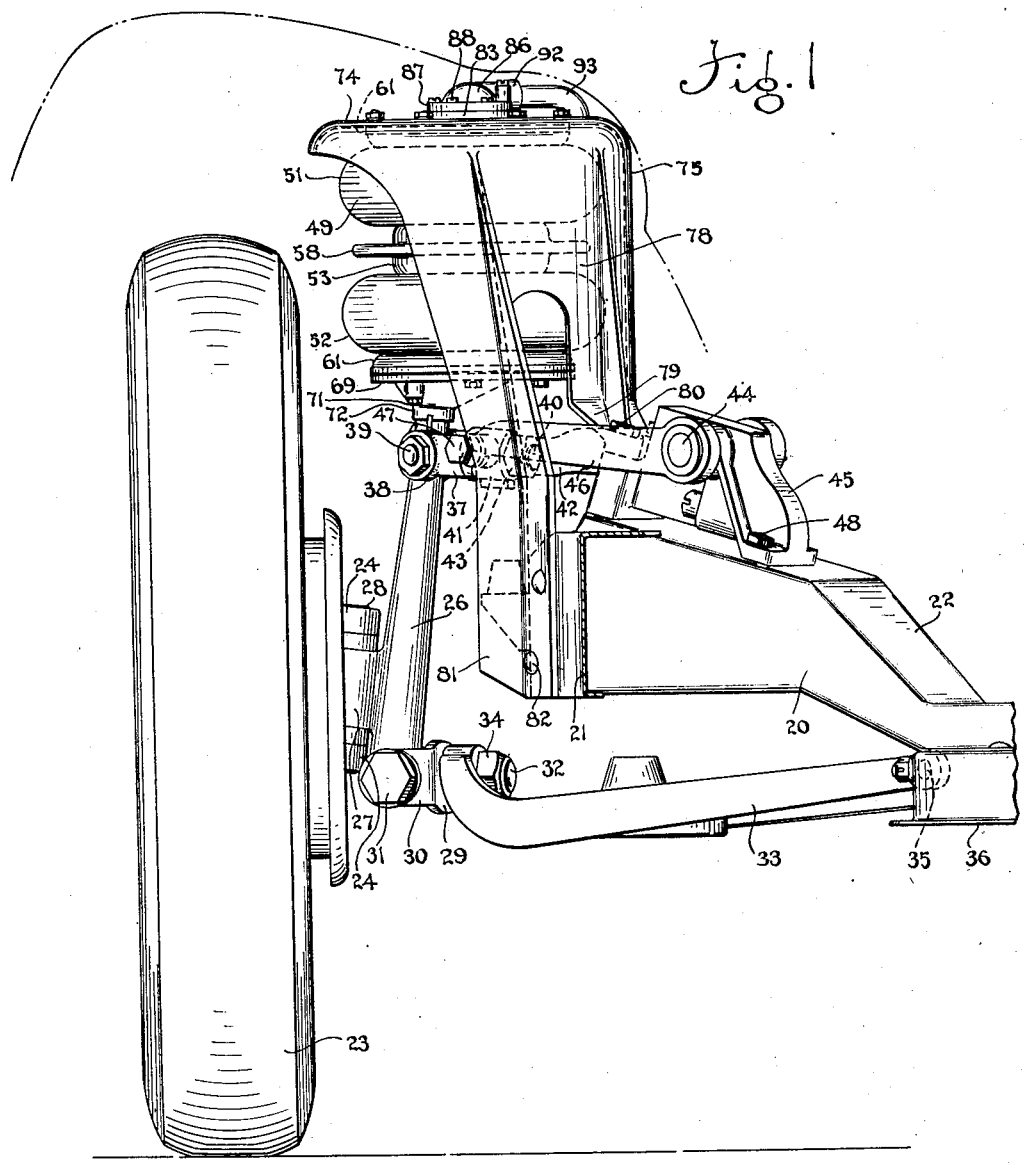
Figure 1 is a front elevational view of a portion of a motor vehicle showing a suspension device embodying the present invention.

Referring to Figures 1 and 2, a chassis 20 is shown of the usual type having longitudinally extending side channel members 21 spaced apart and rigidly connected by a front cross member 22 in any well known manner. While only the left-hand front portion of the vehicle is shown, it should be understood that the right-hand portion is substantially identical therewith so that any further showing is believed unnecessary in order to clearly understand the invention.

A wheel 23 is rotatably mounted upon a stub shaft, the inner end being bifurcated at 24 and provided with aligned openings 25. The said stub shaft is connected to the chassis 20 in any desirable manner, but preferably by the conventional parallelogram linkage comprising an upright member 26 having an integral tubular extension 27 movably positioned between the bifurcated ends 24 and secured therebetween by a pin or bolt 28 in the usual manner. A member 29 has bifurcated ends 30 which are positioned on opposite sides of the lower end of the upright member 26 and pivotally connected thereto by a bolt 31. The member 29 is further provided with a screw-threaded extension 32, on the opposite side from the bifurcated ends 30, which projects through an opening provided at the apex of a pair of angularly extending links 33, being secured thereto by a nut 34. The inner ends of the links 33 are pivotally connected at 35 with adjacent portions of a sub-structure 36 in turn connected to the cross member 22, more clearly shown in Figure 2.

A member 37, similar to the member 29, is also provided with bifurcated ends 38 which are positioned on opposite sides at the upper end of the upright member 26 and pivotally connected thereto by a bolt 39. The member 37 is also provided with a screw-threaded extension 40 on the opposite side from the bifurcated ends 38, which projects through an opening provided in a lateral extension 41 on a link 42 and is secured thereto by a nut 43. The inner end of the link 42 is keyed or otherwise secured to one end of a shaft 44 which is journaled in a housing 45. A link 46 has one end keyed or otherwise secured to the other end of the shaft 44 and its opposite end secured to the end of the lateral extension 41 by a bolt 47. The housing 45 is secured to the cross member 22 by a plurality of bolts 48, more clearly shown in Figure 2. With this arrangement of parallelogram linkages, the wheel 23, while held in proper position, does nevertheless have independent movement with respect to the chassis as well as with respect to the other wheels which may be similarly mounted. So much of the disclosure is standard construction on some types of vehicles at the present time, except that heretofore such assemblies have required the use of hydraulic shock absorbers, and therefore forms no part of the present invention except as the same may be included in combination with the pneumatic suspension device hereinafter described in detail.

In Figure 3 a detailed arrangement of the preferred form of pneumatic suspension is shown wherein a bellows 49, which will be designated as the #6 type, is provided which is substantially circular in plan as more clearly shown in Figure 6. This bellows 49 is made of rubber and cotton cords, two plies being shown herein, although not restricted thereto, vulcanized into an unusually strong, composite structure, which as shown has an integral inner covering of rubber material, similar to that used in making inner tubes, to prevent any leakage of air therethrough.

The bellows 49 is of tubular form being constricted at its central portion 50 for a considerable distance, thus providing two expansible and contractible portions 51 and 52, the former above the central portion and the latter below the central poriton. A girdle ring 53 encircles the outer surface of the central portion 50 preventing any expansion thereof. This ring comprises cooperating half sections preferably formed of steel stampings and having when assembled a cylindrical inner wall 54 coextensive with the central portion 50 of the bellows. The opposite ends 55 are rounded outwardly and portions 56 extend inwardly and then outwardly to form grooved mating flanges 57 terminating in a peripheral bead 58 disposed substantially midway between the portions 51 and 52 of the bellows. The rounded ends 55 are adapted to be engaged by the adjacent portion of the bellows and are shaped so as to prevent sharp bending of the latter during compression or expansion.

The opposite ends of the bellows 49 have outwardly extending, circular, flanged portions 59 terminating in laterally extending peripheral beads 60 similar to the beads on tire casings. Bead rings 61, preferably of rust-proof stamped steel, have flat portions 62 provided with a plurality of openings adapted to receive attaching bolts 63 and a hook portion 64 extending inwardly and engageable with the beads 60. Inverted U-shaped rings 65 are positioned upon the inside of the bead rings 61 and have their outer ends in engagement with peripheral flanges 66 at the outside of the flat portions and their inner ends resting upon flanges 67 provided on the hook portions. The rounded portions of the U-shaped rings are adapted to contact with the adjacent portions of the bellows and should be shaped so as to prevent any sharp bending taking place in the latter during compression and expansion. The ends of the bellows 49 are provided with a plurality of circular ribs 59' spaced apart axially, there being four shown in Figures 20 and 21, although any desired number may be provided. These ribs 59' engage the end plates 68 and 74 and when the bellows 49 is secured therebetween they are compressed and function as a seal to prevent any air from escaping from the interior of the bellows.

The lower end of the bellows 49 has a plate 68 extending thereacross to effectively close the same and its outer portion is provided with openings to receive the bolts 63. An end casting 69 is provided and has openings in its outer portion to receive the bolts 63 which are provided with lock washers 70 and nuts 71 to secure the same and at the same time lock the beads 60 securely. The casting 69 has an offset portion 72 provided with an opening to receive the screw-threaded upper end of the upright member 26 and a nut 73 is provided to prevent disengagement.

The upper end of the bellows 49 is connected by the bolts 63 directly to the top portion 74 of a housing 75. Lock washers 76 and nuts 77 likewise secure the bead ring 61 in place and the bead 60 against displacement. The housing 75 has a depending arcuate portion 78 extending part way around the bellows 49 and adjacent its mid portion the lower end is flared outwardly at 79. Openings are provided in the flared portion 79 in alignment with the openings in the housing 45 and receive bolts 80 by which it is rigidly secured. At the outer ends of the depending portion 78 extensions 81 are provided which likewise have openings in alignment with openings in the chassis and receive bolts or rivets 82 to provide a rigid structure. The relative position of a fender is shown in dot and dash lines in Figure 1.

The top portion 74 of the housing 75 has an opening therein which is substantially coaxial with the axis of the bellows 49 and a flange 83 surrounds the same on the outer side but is spaced slightly therefrom to provide a seat 84. A tubular valve casing 85 of suitable diameter has its upper end positioned in the opening in the top portion 74 and its lower end projecting into the bellows 49. A portion of the casing 85 extends beyond the top portion 74 and is exteriorly screw-threaded. A cover member 86 has an interiorly screw-threaded opening to receive the screw-threaded end of the valve casing 85 and a lateral flange 87 resting upon the flange 83, there being aligned openings in both to receive bolts 88. The cover member also has a depending flange 89 which securely engages a rubber washer or gasket 90 positioned upon the seat 84 to seal the same.

The cover member 86 has a hooded portion 91 provided with a tubular projection 92 within which one end of a tube 93 is secured. The opposite end of the tube 93 is secured to a connection 94 provided upon a fluid reservoir or receptacle 95 which is secured by bolts 96 to the side of the frame member 20 or at any other desirable location. This reservoir is of any desired size and is provided with a valve 97 through which fluid, such as air, may be introduced into the reservoir and from which the fluid is prevented from escaping. The reservoir 95 is in communication with the interior of the bellows 49 and consequently the latter is inflated in this manner to the desired static pressure, depending upon the load which it is required to support.

Although various types of valve mechanism may be employed, the preferred construction is shown in Figures 3, 4 and 7. At the bottom of the valve casing 85 is a cap 98 removably secured thereto by bolts 99. The cap has a central opening 100 and complementary recesses are provided in the adjacent portions of the cap and casing to provide a circular chamber 101 positioned concentrically and outwardly of the opening 100. This provides an upper valve seat 102 on the casing and a lower valve seat 103 on the cap which are spaced apart and in parallelism. A light-weight, hardened steel, disc valve 103 is freely positioned in the space between the valve seats 102 and 103 and is adapted to be moved into engagement with either so as to interrupt the free communication between the bellows 49 and reservoir 95 in a manner to be later described. One or more small openings 105 are provided in the outer portion of the cap to by-pass a small quantity of air around the disc valve 104 when engaging the lower valve seats 103. This disc valve 104 has a raised central portion 104' of definite size.

A valve control member 106 is mounted within the casing 85 and in this instance is of the pendulum type. It consists of a lead weight body portion 107 of approximately frusto-conical shape with the smaller end disposed downwardly and in coaxial alignment with the valve seats when in normal position as shown in Figure 3, it being also spaced from the inner wall of the casing. The body 107 has an axial opening extending therethrough within which one end of a rod 108 is disposed. A cup-shaped rubber member 109 has a brass ferrule 110 secured axially thereof and is mounted upon the lower end thereof, the end of the rod extending through the ferrule and being exteriorly screw-threaded to receive a clamping nut 111. The lower end of the rod 108 has an extension 112 which is adapted to engage the raised portion 104' of the disc valve 104 to hold the valve out of engagement with the upper valve seat 102 when the valve member 106 is in normal vertical position.

The upper end of the rod 108 is formed with a spherical knob 113 disposed within a tubular extension 114 projecting inwardly from the cover 86. This tubular extension is interiorly screw-threaded to receive an exteriorly screw-threaded split plug 115 which has a conical opening 116 therethrough through which that portion of the rod 108 below the spherical knob 113 extends. The plug 115 is adjustable to retain the spherical knob 113 in position, but such adjustment should permit free and easy movement of the weighted body 107 about the knob as an axis. The flaring edge of the rubber member 109 surrounds the lower end of the weighted body 107 and thereby functions as a noiseless bumper when the body swings into engagement with the inner wall of the casing 85 as shown by dotted lines in Figure 4. A pin 117 has its ends secured in the wall of the casing 85 and is positioned to prevent the weighted body 107 from swinging in its direction as more clearly shown in Figure 7.

In the operation of the pneumatic suspension device it will be assumed that a sufficient air pressure has been established in the reservoir 95 and that therefore the same air pressure is established in the bellows 49 inasmuch as the pendulum valve 106 is normally in vertical position with the result that the disc valve 104 is held out of engagement with the upper valve seat 102, thereby establishing free communication between the reservoir and bellows. Furthermore, the air pressure established in the bellows should be sufficient to support the static load of the vehicle body which, for purpose of example, is approximately 400 pounds, although this load naturally differs on different makes of cars, and with the normal overall height of the bellows under this load about equal to the difference between its maximum and minimum positions of expansion and contraction. With this relationship the parts assume the shape and appear as shown in full lines in Figure 3, where in the experimental development the bellows 49 was slightly over 8" in diameter and 7½" in length under a pressure of 14.1 pounds per square inch.

Now, suppose that the wheel of the vehicle hits an obstruction in the road while travelling and compresses the bellows from the normal length of 7½ inches to a length of 5 inches. Assuming that the bellows is connected to a 300 cubic inch reservoir, reference to the curves in Figure 17 shows that at a length of 7½ inches the suspension will have a rate of approximately 108 pounds per inch while at a length of 5 inches the rate is approximately 160 pounds per inch under static conditions, that is, when the bellows is compressed and elongated very slowly so that there is no appreciable resistance to flow of the air between the bellows and reservoir. It is to be understood, however, that under dynamic conditions as when the bellows is compressed quickly, as when the wheel passes over an irregularity in the road at high speed, the rate will be considerably greater due to the resistance to the transfer of the air from the bellows to the reservoir. The recoil movement will be greatly retarded because the valve 104 will seat on the lower valve seat 103 and the return of the air from the reservoir to the bellows will be limited to the small by-pass orifices 105. This effectively retains a portion of the energy of the impact force which caused compression, in the reservoir and releases it slowly to the system to establish a condition of equilibrium again.

It will be understood that the damping characteristic of such a system for different frequencies of oscillation will be largely determined by the transfer of the compressible fluid between the reservoir and bellows through the restricted conduit and valve openings and that this will change for different frequencies of vibration or relative acceleration between the running gear and body or frame.

By taking advantage of the characteristic of increasing rate with deflection, "bottoming" can be eliminated while still retaining extremely "soft" rides on all lesser deformations. In the suspension shown in Figure 3, this is obtained by providing a diameter of the constricted portion 50 of the bellows slightly less than the diameter of the beads 60 and then providing rounded portion 65 on the bead rings and rounded portions 55 on the girdle ring 53 which progressively engage adjacent portions of the bellows during deflection of the latter so that the rate increases on compression or extension from some mid-length the exact value of which is determined as indicated in Figure 17 by the size reservoir used. To increase this rate to an even greater degree to prevent "bottoming", the girdle ring 53 has the lateral circumferential flange provided with grooved flanges 57 and the peripheral bead 58 positioned so as to be engaged by the adjacent portions of the bellows upon excessive compression such as is shown in dot and dash lines in the upper portion of Figure 3. Thus when a wheel hits a road obstruction which would ordinarily cause complete compression of the bellows to the point of bottoming, the compression of the bellows is increasingly resisted by engagement of the latter with the grooved flanges 57 and bead 58 of the girdle ring 53 with the result that rate of resistance to the compression of the bellows is built up rapidly enough to stop the complete compression and thus prevent bottoming.

It will be further noted that the movement of the bellows 49 during the compression stroke is not in a vertical direction along the normal axis. This is because of the unequal length of the upper and lower parallelogram arms and the relative positions of points of rotation which results in the bottom casting 69 moving from the position shown in full lines in Figure 3 about an arc 118 to the position shown in dot and dash lines. Due to this arcuate movement, the bellows 49, in the suspension, during its compression stroke has the lower right side of the portion 51 engageable with the upper adjacent portion of the flange on the girdle ring 53 while the upper left-hand side of the portion 52 is engageable with the lower adjacent portion of the flange on the girdle ring 53, or in other words the engagement is on diagonally opposite sides of the flange on the girdle ring 53, as viewed in Figure 3. This engagement, however, builds up pressure sufficient to retard and resist the relative movement between chassis and wheels to prevent "bottoming."

The smooth dampening characteristic of moving air through a closed system effectively augments the natural functional dampening of the chassis, thus further reducing the need for shock absorbing devices.

Of course when the bellows 49 is compressed under ordinary operating conditions, the pendulum valve 106 is substantially perpendicular as shown in Figures 3 and 4 with the result that the disc valve 104 is prevented from engagement with the upper valve seat 102 and communication between the bellows and reservoir is maintained, the movement being increasingly resisted and the shock absorbed. Upon the rebound stroke, the disc valve 104 is moved into engagement with the lower valve seat 103 which shuts off communication and the movement is likewise retarded, but in this instance ports 105 permit the passage of some of the air from the tank to the bellows so as to control the rate of retardation. If the initial compression of the bellows, under the conditions set forth, is so great and sharp as to cause extreme rebound, the bellows will elongate to such an extent that its volumetric capacity is progressively reduced, thus exerting pressure upon the air therein sufficient to lift the valve disc 104 and thereby again to place the bollows directly in communication with the reservoir 95, with the result that the rate is not increased so rapidly as to cause discomfort.

The overturning movement occurring in rounding curves has been heretofore determined. The "soft" independent front suspension placed on passenger cars recently aggravated the condition to such an extent as to result in definite unfavorable reactions to the driving public. The insertion of a valve between the bellows 49 and tank 95, arranged to close when a pendulum above the valve swings outwardly by centrifugal force from rounding curves, makes available for resisting the overturning movement the much higher rate of the bellows alone. For example, referring to Figure 3, when the vehicle rounds a curve, the pendulum 106 swings to one side as indicated in dotted lines, thus moving the extension 112 out of engagement with the raised portion 104' on the disc valve 104, permitting the latter to engage the upper valve seat 102 to shut off communication between the bellows 49 and tank 95. The angular rotation of the chassis is therefore retarded by the higher compression rate of the bellows without reservoir in the manner heretofore explained.

This same valve is employed to counteract the nosing down of the body front resulting from braking the vehicle and which is much more noticeable with the present type of independent front wheel suspension of low rate. The operation of the valve is much more clearly shown in Figure 4. Assuming that the right hand side of Figure 4 is toward the front of the vehicle, as the vehicle is braked the pendulum 106 moves to the right as shown by dotted lines, thus moving the extension 112 out of engagement with the raised portion 104' on the disc valve 104 which causes the disc valve 104 to be moved into engagement with the upper valve seat 102, thus shutting off communication between the bellows 49 and tank 95. In this manner the nosing down movement of the body is retarded and checked by the high compression rate of the bellows without reservoir within which an increasing pressure is built up. As an example, the momentary rate of the suspension without reservoir is 160 pounds per inch at bellows length of 7½ inches (Figure 17), instead of 92 pounds per inch with 600 cubic inch reservoir, this greatly minimizing the depression of the car front. The pin 117 is provided to restrict the pendulum from swinging in undesired directions. The rubber member 109 is provided to render the swinging movement quiet inasmuch as the weight 107 normally has sufficient movement to hit the inside wall of the casing 85. Also the raised portion 104' on the disc valve 104 can be made to different diameters depending upon the horizontal acceleration at which it is desired to have the disc valve operate, the smaller the diameter the lower the acceleration and the larger the diameter the higher the acceleration at which operation occurs, so that its operation can be very definitely predetermined. The valve may be rotated 90° when placed at the rear of the car, thus minimizing the depressing of the rear portions of the car resulting from power acceleration.

Since the specific heat of air varies inappreciably over the range of pressures used, compression and expansion approach adiabatic. The shape of the pressure volume curves deviates appreciably from the approximately sinusoidal displacement-time chassis vibration curve which tends to minimize propagation of synchronous vibrations.

Some heat flow to and from the enclosing structures occurs and some slight temperature increase results from friction effects. The extent of both is influenced by the time and rate of the compression and expansion. This transfer and loss of heat results in a somewhat graduated dampening action, increasing with rate of application of compression or expansion. The magnitude of these effects increases appreciably with closure of the pendulum shock absorber valve.

In Figure 5 a modified form of valve structure is shown in which the main difference resides in the provision of flat spring members 119, of which there are four in number, positioned approximately 90° apart around the pendulum, the lower ends being connected by screws 120. The upper ends of the springs are free and extend outwardly into engagement with the inner wall of the valve casing, being under sufficient tension to minimize the tendency of the pendulum to deviate from the perpendicular due to vibration from road irregularities. The springs should, however, be resilient enough to permit the pendulum to swing about its axis under the action of centrifugal and other forces resulting from driving the vehicle around curves and also to oscillate under the impetus of inertia when the brakes are applied to stop the vehicle. The operation of this valve is identical with the operation of the valve shown in Figure 4 heretofore explained. As stated, this construction has the advantage of normally maintaining the pendulum against free movement.

In Figure 8 a modified construction of the suspension is shown, many of the parts, however, being the same as the parts heretofore explained in connection with the construction shown in Figure 3. In this construction a portion of the chassis 121 has a spherical cap 122 connected thereto by means of bolts 123. These parts are provided with a spherical chamber 124 to which a rubber gasket 125 is secured. A stem 126 has a spherical end 127 which is disposed within the spherical chamber 124, the rubber gasket being disposed therebetween. The stem 126 projects outwardly through an opening in the bottom of the cap and chassis and its lower end extends within the upper end of a tube 128, being secured thereto by a pin 129. An upper end plate 130 has a peripheral flange 131 and an axial opening surrounded by a flange 132 of sufficient diameter to receive the upper end of the tube 128. The tube and flange are welded or otherwise secured together to provide an air-tight connection. A second tube 133 is telescopically mounted upon the lower end of the tube 128 and has collars 134 surrounding the tube 128 and secured to the inner wall of the tube 133 for movement therewith, these sleeves being spaced apart axially so as to provide a suitable bearing for the relatively movable tubes. A disc 135 is secured within the tube 133 at its lower end in such a manner as to seal the tube against the passage of air, this disc being positioned below the end of the tube 128. The tube 133 has its lower end connected to a wheel support, not shown.

A lower end plate 136 has a peripheral flange 137 and an axial opening provided with a flange 138, the opening being of sufficient diameter to receive the upper end of the tube 133 and being welded or otherwise connected thereto so as to provide an air-tight connection. A bellows 139 of a construction similar to that shown in Figure 3, but identified as type #2, is provided and positioned between the upper and lower end plates 130 and 136, respectively. This bellows has beads 60 at its opposite ends and clamping rings secured to the end plates and adapted to engage the beads in the manner heretofore described in connection with Figure 3. The bellows is likewise provided with a constricted central portion 140 having a diameter which is less than the diameter of the beads. In this instance the constricted portion is provided with a circumferential bead 141 disposed substantially midway of its ends. A reinforcing or spacing member 142 is provided upon the inside of the bellows and comprises cooperating half sections in the form of stampings.

The outer ends of these stampings are curved outwardly at 143 so as to adapt them to fit within the bead 141. The metal extends inwardly in the form of a flange in abutting relation and the inner ends are then bent outwardly and inwardly at 144 terminating in an axial opening through which the tube 128 extends. Wear-resisting material 145 is enclosed within the space provided by the end portions 144 and has a portion engageable with the tube 128 to prevent wear but at the same time to permit unrestricted longitudinal movement of the bellows with respect to the tube. The flanged portions of the member are provided with openings 146 so as to establish communication between the upper and lower portions of the bellows.

A girdle ring 147 is likewise provided and consists of cooperating half sections which when in assembled position has upper and lower flanges 148 adapted to engage the outer wall of the constricted portion, the opposite ends being bent around a radius at 149 and with the outer ends in engagement circumferentially.

The function of the girdle ring is substantially the same as the function of the girdle ring disclosed in Figure 3, that is, to prevent any sharp bending of the bellows and at the same time forming the rounded portion 149 on such an arc as to provide for increasing resistance to the compression of the bellows.

In this construction the valve mechanism is similar to the valve mechanism shown in Figures 3 and 4 and therefore needs no detailed explanation as to its operation other than to say the valve is disposed between the bellows 138 and the tank or reservoir, the valve member 104 being positioned so that under normal conditions communication is established between the bellows and the tank. In addition for this purpose an opening 150 is provided in the upper end plate through which the air may flow from the tank to the bellows. Upon compression of the bellows the pressure therein is increased gradually in proportion to the compression to resist and retard its movement, which in turn, of course, absorbs the shock causing the compression. Upon expansion of the bellows the disc valve 104 moves into engagement with the lower valve seat and confines communication between the bellows and tank to the openings 105. This acts as a resistance to the recoil stroke and this resistance may be governed or regulated by increasing the size or number of by-pass openings 105.

In Figure 9 substantially the same construction is disclosed as that of Figure 8 and therefore the structural features will not need repetition as to their assembly and operation. It might be further stated that in this construction the girdle ring employed is the same as the girdle ring employed in Figure 3, indicating that various types of girdle rings may be employed for the purpose intended provided that the important features are embodied therein. Attention is drawn to the fact that the bellows 49' in this particular instance is of slightly different dimensions than the bellows disclosed in Figure 3 and is what is termed the No. 4 bellows with respect to the charts. It has been found under certain conditions that it is undesirable to mount the valve mechanism upon the bellows as shown in Figure 8 and therefore the valve mechanism in Figure 9 is shown mounted within the tank or receptacle 95. A pipe 151 has its upper end connected to a fixture 152 secured to the upper end plate of the bellows in such a manner as to establish communication with the inside of the bellows. This connection should be air-tight and therefore it may be welded or otherwise secured. The lower end of the pipe 151 is connected with the cover member 86 of a construction similar to that shown in Figure 3 and this connection should likewise be air-tight and may therefore be welded or otherwise secured. The valve casing 85 extends within the tank or reservoir 95 and has a cap 153 removably connected thereto. This cap is provided with openings 154 for the purpose of providing communication between the interior of the tank and the interior of the valve casing. The pendulum 106 is swivelly supported by means of the spherical end 113 in a manner already described and the lower end of the pendulum is provided with a rubber cup-shaped member 155 similar to the cup-shaped member 109 in Figure 4, but being slotted out around its periphery to provide spaced fingers or extensions 156. These extensions are adapted to engage the inner wall of the valve casing during the swinging movement of the pendulum to prevent noise and knocking which would result in noticeable vibrations. The disc valve 104 has a pair of spaced tongues 157 adapted to be positioned on opposite sides on one of the securing bolts as shown more clearly in Figure 10 to prevent rotation of the valve and the raised portion 104' on the disc valve is provided with flat surfaces 158 and 159, the latter being towards the front side of the vehicle and the former to the outside of the vehicle as viewed from the driver's seat. This arrangement permits operation of the disc valve 104 when the pendulum swings in the direction of these flattened surfaces which results from the deceleration caused from applying the brakes to the vehicle and/or rounding a curve toward the left. It will be understood that the laterally facing flat side 158 will be oppositely disposed in the valve associated with the suspension unit on the opposite front wheel of the vehicle, whereby sidesway arising from turning the corner in the opposite direction is counteracted by operation of its associated valve. The arcuate surfaces of raised portion 104' engage the extension 112 at all times, thus preventing the valve from seating in event vibration causes the pendulum to wander about the angular position represented by such surfaces.

In Figure 11 a still different type of bellows is illustrated and constitutes what is termed the #1 bellows with reference to the charts. This comprises an outer flexible bellows 160 of rubberized fabric produced by vulcanizing rubber and cotton cords into an unusually strong composite unit of the desired thickness and of tubular form, the central portion being constricted at 161 by means of a tubular ring 162 extending circumferentially and axially disposed. The opposite ends of the bellows 160 extend outwardly and terminate in annular concentric beads 163. A metal ring 164 is provided at the lower end with a curved upper surface 165 adapted to engage the adjacent portion of the bellows 160 and has an inwardly extending annular projection 166 of complementary shape to the bead 163 and directly engageable with the latter to secure the same in the desired position. A circular metal plate 167 extends across the open end of the bellows 160 and over the ring 164 and is secured in place by a casting 69 which is secured by bolts 167' which extend through aligned openings in the casting and plate and have screw-threaded engagement with the ring 164. The casting 69 has an extension 72 provided with an opening which receives the upper end of the upper right member 26 and is keyed against relative rotation. A nut 73 secures the upper end of the right member against disengagement.

The upper end of the bellows 160 is similarly secured to that heretofore described with respect to the lower end thereof. A ring 168 engages the upper bead 163 in the same manner and also has a plate 169 which is positioned above and extends across the adjacent end of the bellows and is coextensive with the diameter of the ring 168. A top plate 170 similar to the top plate 74 in Figure 1 is positioned above the plate 169 and is secured by bolts 171 which pass through aligned openings in the top plate 170 and the plate 169 and have screw-threaded engagement with the openings provided in the ring 168. By tightening up on these bolts the beads are securely clamped in position against displacement. A valve casing 172 is positioned at the upper end of the bellows and has a member 173 secured to its outer side. This member 173 is provided with a laterally extending circumferential flange 174 which receives a cap member 175 connected thereto by means of bolts 176. The pendulum 106 is swivelly mounted by means of the spherical end 113 in the under side of the cap 175 in a manner already described and functions on precisely the same principle. The disc valve 104 is provided and its operation is controlled by the movement of the pendulum 106 in the manner heretofore described.

The member 173 is further provided with a lower laterally extending circumferential flange 177 which is spaced from the flange 174 to provide a peripheral groove which receives one end 178 of an inner tube 179, this inner tube extending around the inner wall of the bellows 160. The inner tube also has a portion 180 which extends beneath the extension 177, these parts being preferably vulcanized to the flange so as to provide a rigid, air-tight connection. In this particular instance the inner tube 179 is removably disposed within the bellows and is made as a separate part therefrom in distinction to the unitary construction disclosed in Figure 3.

In this instance it will be noted that the inside diameter of the constricted portion of the bellows is greater than its inside diameter at the beads and, while the construction has certain advantageous features, does not of course produce the result obtained with the use of bellows such as is disclosed in Figure 3 as will be apparent from a comparison of the relative curves on the charts. The principle of operation, however, is the same.

In Figure 12 a still further modified form of the valve mechanism is disclosed and is shown in conjunction with the type of suspension illustrated in Figure 11. Therefore the relative parts will not need further explanation. In this instance, however, a valve casing 181 is provided which has a laterally extending circumferential flange 182 provided adjacent its lower end, the under side of which is adapted to rest upon the end of an extension 183 provided upon a member 184 which is adhesively secured to the inner tube. The extension 183 is exteriorly screw-threaded and receives a locking nut 185 which has a portion engageable with the upper side of the extension 182 so as to secure the housing in place. The housing is provided with an opening 186 in its upper end within which is disposed a spherical end 187 of a screw-threaded extension 188. A plate 189 is positioned upon the top of the casing 181 and is removably secured in place by bolts 190, the plate extending across the opening 186 so as to prevent accidental removal of the screw-threaded extension 188 and to provide an air-tight chamber. A weighted member 191 having a tapered upward end is provided with an axial screw-threaded opening adapted to receive the screw-threaded extension 188, a bore being provided within the lower end to receive a locking stud 192. This weighted member 191 has a cylindrical side wall and is provided with diverging passageways 193 which join with an axial passageway 194. The lower end of the weighted member has an arcuate surface 195 adapted to move over a recessed surface 196 provided in the upper side of the member 184. This member 184 also has an axial opening 197 which is in alignment with an axial opening 198 provided in the inner tube. When the valve member is in normal position the opening 194 is in alignment with the openings 197 and 198 and therefore permits passage of the air therethrough establishing communication between the interior of the bellows and the tank. When the weighted member is moved due to centrifugal force about the axis of the spherical end 187 to an extent in which the opening 194 has been moved out of communication with the opening 197, communication between the bellows and reservoir is interrupted.

In Figures 13 and 13ª a construction is illustrated which embodies the inclusion of an additional air reservoir or tank and this directly within the bellows of a construction disclosed in Figure 3 and is adapted to operate in conjunction with the valve mechanism also disclosed in Figure 3. It has been found that the body vibrations can be very easily counteracted and absorbed by the construction disclosed in Figure 3 because the cycle is not so high or rapid. However, the vibrations caused from impacts on the wheel from the road are very high in relative frequency and therefore cannot be suitably dampened without providing an additional reservoir. It is therefore proposed to provide an air reservoir 199 which has a lateral flange 200 adapted to be positioned between the plate 66 and the bead and clamping ring. Openings are provided through which the bolts 63 are adapted to extend thereby utilizing these same bolts for securing the auxiliary reservoir in place. The reservoir has a tubular extension 201 axially arranged and of the desired capacity for the purpose for which it is intended. The upper end of this tubular extension is bent inwardly at 202, angularly at 203 and then inwardly at 204, terminating in an axial opening 205. A metal strap member 206 has depending extensions 207 at its opposite ends which are adapted to be secured to the inner wall of the tubular extension 201, the upper end abutting the inward extension 202. This provides a space 208 between the top of the strap member 206 and the under surface of the extension 204 within which a disc valve 209 is disposed. The disc valve 209 is of a diameter greater than the diameter of the opening 205 and the valve is adapted under certain conditions to close the opening for a purpose to be later described. The disc valve 209 is maintained in proper position by means of an extension 210 which is received in an axial opening provided in the strap member 206. An opening 211 is provided in the inwardly extending portion 204 beyond the periphery of the disc valve 209 to permit restricted flow of air between the interior of the bellows and the interior of the auxiliary reservoir.

In operation, when the bellows is compressed, the disc valve 209 is moved downwardly away from the opening 205 and thus air is forced into the auxiliary reservoir 199. It will be noted that the air which is forced into this reservoir is introduced when the air within the bellows is at its highest pressure. When the compression is released and the bellows starts to expand the valve 209 is moved into engagement with the upper end of the reservoir, thus closing off communication through the opening 205, hence equalization of pressure between the bellows and reservoir is delayed due to the restricted size of openings 211. Inasmuch as this auxiliary reservoir is in direct communication with the wheel, vibrations imparted thereto are transmitted directly to this reservoir. The acceleration from these vibrations results in forces due to the weight of the valve which tend to force the valve to operate as above described even though pressures on opposite sides of the valve disc may be different. This inertia effect may be varied as desired by adding weight within the hollow extension 210. Thus wheel movement is effectively dampened due to delaying of restoration of normal pressure in the bellows on the extension stroke following a forced compression.

In Figures 14 and 15, a still further modification of the invention is shown wherein instead of having the air reservoir or tank in a remote location from the bellows, it is made as part of the bellows supporting structure. In this instance a tank or reservoir 212 is mounted directly above the bellows housing 213 and is provided with a valved connection 214 by means of which air may be introduced into the reservoir under the desired pressure. One of these tanks of course is mounted in conjunction with each of the bellows. A valve casing 215 is mounted in the end of the bellows in a manner similar to that shown in Figure 3 and has a pendulum mounted in a similar manner to control the operation of a disc valve so that when the pendulum is in perpendicular position communication is established between the interior of the bellows and the interior of the tank. When the pendulum is swung about its axis due to centrifugal force from causes as heretofore explained, the end of the pendulum is moved away from the disc valve and the latter is permitted to seat upon the upper valve seat during the compression of the bellows, with the result that communication between the bellows and reservoir is interrupted. Upon expansion of the bellows the disc valve is moved into engagement with the lower valve seat, thus interrupting communication between the interior of the bellows and the tank excepting for a small amount of air which is permitted to pass through the by-pass opening 135. The operation of this construction is precisely the same as that already explained in connection with the other suspensions, excepting for pressure drop which occurs in the piping 151, Figure 9.

While I have described the preferred embodiments of the invention, it should be understood that I am not to be limited thereto inasmuch as changes and modifications may be resorted to without departing from the spirit of the invention as defined in the appended claims.

What is claimed is:

1. A pneumatic suspension for vehicles and the like comprising a flexible bellows having portions connected respectively with the chassis and wheel and adapted to receive air under pressure, a reservoir mounted exteriorly of said bellows and adapted to receive air under pressure, a conduit connecting the interior of said bellows with the interior of said reservoir, a valve member movably mounted between said bellows and reservoir and adapted to control the flow of air through said conduit, and an oscillatory member for controlling the movement of said valve member, said oscillatory member being normally positioned for engagement with said valve member upon the compression of said bellows to thereby maintain unrestricted communication between said bellows and reservoir whereby relative movement of said chassis and wheel toward each other is increasingly resisted by reason of the building up of pressure, said valve member being moved out of engagement with said oscillatory member on the expansion of said bellows and to a position in which communication between said bellows and reservoir is effectively shut off whereby the built-up pressure tends to resist the rebound movement of said chassis and wheel.

2. A pneumatic suspension for vehicles and the like comprising a flexible bellows having portions connected respectively with the chassis and wheel and adapted to receive air under pressure, a reservoir mounted exteriorly of said bellows and adapted to receive air under pressure, a conduit connecting the interior of said bellows with the interior of said reservoir, a valve member movably mounted between said bellows and reservoir and adapted to control the flow of air through said conduit, and an oscillatory member for controlling the movement of said valve member, said oscillatory member being normally positioned for engagement with said valve member upon the compression of said bellows to thereby maintain unrestricted communication between said bellows and reservoir whereby relative movement of said chassis and wheel toward each other is increasingly resisted by reason of the building up of pressure, said valve member being moved out of engagement with said oscillatory member on the expansion of said bellows and to a position in which communication between said bellows and reservoir is effectively shut off whereby the built-up pressure tends to resist the rebound movement of said chassis and wheel, the pressure in said bellows being gradually reduced by by-passing the air within said bellows around said valve member.

3. A pneumatic suspension for vehicles and the like comprising a flexible bellows having portions connected respectively with the chassis and wheel and adapted to receive air under pressure, a reservoir adapted to receive air under pressure, a conduit connecting the interior of said bellows with the interior of said reservoir, a valve member movably mounted between said bellows and reservoir and adapted to control the flow of air through said conduit, and an oscillatory member for controlling the movement of said valve member, said oscillatory member being normally positioned for engagement with said valve member to maintain unrestricted communication between said bellows and reservoir, said oscillatory member being influenced by acceleration in a plane transverse to its normal axis whereby said oscillatory member is moved out of operative engagement with said valve member to permit the latter to shut off communication between said bellows and reservoir to thereby increasingly resist body movement caused therefrom.

4. A pneumatic suspension for vehicles and the like comprising a flexible bellows having portions connected respectively with the chassis and wheel and adapted to receive air under pressure, a reservoir adapted to receive air under pressure, a conduit connecting the interior of said bellows with the interior of said reservoir, a valve member movably mounted between said bellows and reservoir and adapted to control the flow of air through said conduit, and movable means for controlling the movement of said valve member, said means being normally positioned for engagement with said valve member to maintain unrestricted communication between said bellows and reservoir, said means being influenced by acceleration in a plane transverse to its normal axis whereby said means is moved out of operative engagement with said valve member to permit the latter to shut off communication between said bellows and reservoir to thereby increasingly resist body movement caused therefrom.

5. A pneumatic suspension for vehicles and the like comprising a flexible bellows having portions connected respectively with the chassis and wheel and adapted to receive air under pressure, a reservoir adapted to receive air under pressure, a conduit connecting the interior of said bellows with the interior of said reservoir, a valve member movably mounted in said bellows and adapted to control the flow of air through said conduit, and an oscillatory member for controlling the movement of said valve member, said oscillatory member being normally positioned for engagement with said valve member upon the compression of said bellows to thereby maintain unrestricted communication between said bellows and reservoir whereby relative movement of said chassis and wheel toward each other is increasingly resisted by reason of the building up of pressure, said valve member being moved out of engagement with said oscillatory member on the expansion of said bellows and to a position in which communication between said bellows and reservoir is effectively shut off whereby the built-up pressure tends to resist the rebound movement of said chassis and wheel.

6. A pneumatic suspension for vehicles and the like comprising a flexible air-containing bellows having beads at its opposite ends and a constricted mid-portion, clamping members for said beads and adapted for connection respectively with the chassis and wheel of the vehicle, a girdle ring positioned about said constricted mid-portion and provided with curved portions adapted for progressive engagement with the adjacent portions of said bellows during compression of the latter, a reservoir mounted exteriorly of said bellows and adapted to receive air under pressure, a conduit connecting the interior of said reservoir, a movable valve member for controlling the flow of air through said conduit, and means for controlling the movement of said valve member, said means normally maintaining said valve member in one position whereby unrestricted communication is established between said bellows and reservoir, said means being influenced by horizontal accelerations whereby said valve member is moved to another position in which communication between said bellows and reservoir is shut off.

7. A pneumatic suspension for vehicles and the like comprising a flexible air-containing bellows having beads at its opposite ends and a constricted mid-portion, clamping members for said beads and adapted for connection respectively with the chassis and wheel of the vehicle, a girdle ring positioned about said constricted mid-portion and provided with curved portions adapted for progressive engagement with the adjacent portions of said bellows during compression of the latter, a reservoir mounted exteriorly of said bellows and adapted to receive air under pressure, a conduit connecting the interior of said bellows with the interior of said reservoir, a movable valve member for controlling the flow of air through said conduit, and an oscillatory member for controlling the movement of said valve member, said oscillatory member being normally positioned for engagement with said valve member to maintain unrestricted communication between said bellows and reservoir, said oscillatory member being influenced by acceleration in a plane transverse to its normal axis whereby said oscillatory member is moved out of operative engagement with said valve member to permit the latter to shut off communication between said bellows and reservoir.

8. A pneumatic suspension for a motor vehicle having a chassis, a wheel and a parallelogram connection therebetween for independent relative movement, of a flexible air-containing bellows having one end secured to said chassis and its opposite end secured to the wheel end of said parallelogram connection, whereby the entire amplitude of movement of the wheel relative to the chassis is transmitted directly to the bellows.

9. A pneumatic suspension for a vehicle and the like comprising an air-containing bellows having opposite portions connected respectively with the chassis and wheel of the vehicle, a valve casing mounted in one end of said bellows in communication therewith and having a pair of spaced valve seats, a valve member disposed between said valve seats and adapted for engagement therewith, a pendulum having one end pivotally mounted in said valve casing and its opposite end freely swingable and cooperable with said valve member for controlling the movement of the latter, said pendulum being normally in engagement with said valve member for maintaining the latter in inoperative position, a reservoir adapted to contain air under pressure, and means connecting the interior of said reservoir with the interior of said valve casing ahead of said valve member, said bellows being in communication with said reservoir through said valve member.

10. A pneumatic suspension for a vehicle and the like comprising an air-containing bellows having opposite portions connected respectively with the chassis and wheel of the vehicle, a valve casing mounted in one end of said bellows and having a pair of spaced valve seats, a flat disc valve member disposed between said valve seats and adapted for engagement therewith, said valve member having a raised central portion of lesser extent than said valve seats, a pendulum having one end pivotally mounted in said valve casing and its opposite end freely swingable and cooperable with the raised central portion of said valve member for controlling the movement of the latter, said pendulum being normally in engagement with the raised central portion of said valve member for maintaining the latter in inoperative position, a reservoir adapted to contain air under pressure, and means connecting the interior of said reservoir with the interior of said valve casing ahead of said valve member, said bellows and reservoir being adapted to be put in communication through the agency of said valve member.

11. A pneumatic suspension for a vehicle and the like comprising an air-containing bellows having opposite portions connected respectively with the chassis and wheel of the vehicle, a valve casing mounted in one end of said bellows and having a pair of spaced valve seats, a valve member disposed between said valve seats and adaptable for engagement therewith, a weighted pendulum having one end pivotally mounted in said casing and its weighted end freely swingable and cooperable with said valve member, a reservoir adapted to contain air under pressure, and means connecting the interior of said reservoir with the interior of said valve casing ahead of said valve member, said bellows and reservoir being put in communication with each other through the agency of said valve member.

12. A pneumatic suspension for a vehicle and the like comprising an air-containing bellows having opposite portions connected respectively with the chassis and wheel of the vehicle, a valve casing mounted in one end of said bellows and having a pair of spaced valve seats, a valve member disposed between said valve seats and adaptable for engagement therewith, a weighted pendulum having one end pivotally mounted in said casing and its weighted end freely swingable and cooperable with said valve member, a bumper of yieldable material connected to the lower portion of the weighted end of said pendulum and adapted for engagement with the adjacent inner wall of said casing, a reservoir adapted to contain air under pressure, and means connecting the interior of said reservoir with the interior of said valve casing ahead of said valve member, said bellows and reservoir being put in communication with each other through the agency of said valve member.

13. A pneumatic suspension for a vehicle and the like comprising an air-containing bellows having opposite portions connected respectively with the chassis and wheel of the vehicle, a valve casing mounted in one end of said bellows and having a pair of spaced valve seats, one of said valve seats being provided with a by-pass therearound, a valve member disposed between said valve seats and adapted for engagement therewith, a pendulum having one end pivotally mounted in said valve casing and its opposite end freely swingable and cooperable with said valve member for controlling the movement of the latter, said pendulum being normally in engagement with said valve member for maintaining the latter in inoperative position, a reservoir adapted to contain air under pressure, and means connecting the interior of said reservoir with the interior of said valve casing ahead of said valve member, said bellows and reservoir being put in communication with each other through the agency of said valve member.

14. A pneumatic suspension for vehicles and the like comprising a flexible air-containing bellows having a constricted mid-portion and open opposite ends provided with marginal flanges terminating in circumferential beads, plates closing the open ends of said bellows, bead-clamping means including stamped rings having flat portions secured to said plates and integral hook-shaped portions about the inner periphery thereof engageable with said beads, and stamped members removably mounted on said rings and having curved outer surfaces progressively engageable with the adjacent portions of said bellows.

15. A pneumatic suspension for vehicles and the like comprising a flexible air-containing bellows having a constricted mid-portion and open opposite ends provided with marginal beads, plates closing the open ends of said bellows, one of said end plates being adapted for connection to the chassis, bead-clamping means connected to said end plates, a tubular member having one end connected to the other of said end plates and extending axially of said bellows, and a guide member having one end swivelly connected to said first-mentioned end plate and its opposite end slidably disposed in said tubular member.

16. A pneumatic suspension for vehicles and the like comprising a flexible air-containing bellows having a constricted mid-portion and open opposite ends provided with marginal beads, plates closing the open ends of said bellows, one of said end plates being adapted for connection to the chassis, bead-clamping means connected to said end plates, a tubular member having one end connected to the other of said end plates and extending axially of said bellows, a guide member having one end swivelly connected to said first-mentioned end plate and its opposite end slidably disposed in said tubular member, and a bumper member secured in said tubular member below the adjacent end of said guide member.

17. A pneumatic suspension for vehicles and the like comprising a flexible air-containing bellows having a constricted mid-portion and open opposite ends provided with marginal beads, a non-flexible girdle ring encircling the constricted mid-portion of said bellows, plates closing the open ends of said bellows, one of said end plates being adapted for connection to the chassis, bead-clamping means connected to said end plates, a tubular member having one end connected to the other of said end plates and extending axially of said bellows, and a guide member having one end swivelly connected to said first-mentioned end plate and its opposite end slidably disposed in said tubular member.

18. A pneumatic suspension for vehicles and the like comprising a flexible air-containing bellows having a constricted mid-portion and open opposite ends provided with marginal beads, plates closing the open ends of said bellows, one of said end plates being adapted for connection to the chassis, bead-clamping means connected to said end plates, a tubular member having one end connected to the other of said end plates and extending axially of said bellows, a guide member having one end swivelly connected to said first-mentioned end plate and its opposite end slidably disposed in said tubular member, a reservoir adapted to receive and contain air under pressure and remotely mounted with respect to said bellows, a conduit connecting the interior of said bellows with the interior of said reservoir, a movable valve member mounted on said reservoir and adapted to control the flow of air between said bellows and reservoir, and a pendulum having one end pivotally mounted and its free end cooperating with said valve member to control the latter, said pendulum and valve member being normally in engagement to maintain unrestricted communication between said bellows and reservoir and being capable of oscillating movement out of engagement with said valve member whereby said communication is shut off.

19. A pneumatic suspension for vehicles and the like comprising a flexible air-containing bellows having opposite portions connected respectively with the chassis and wheel of the vehicle, a valve casing mounted in one end of said bellows and having a pair of spaced valve seats, a valve member disposed between said valve seats and normally urged by gravity into engagement with one of them, a pendulum having one end pivotally mounted in said valve casing and its opposite end freely swingable and cooperable with said valve member for controlling the movement of the latter, said pendulum being normally in position to prevent said valve member from seating upon the other valve seat, a reservoir adapted to contain air under pressure, means for connecting the interior of said reservoir with the interior of said casing ahead of said valve member and normally establishing unrestricted communication, an auxiliary air reservoir connected to the wheel end of said bellows and disposed within the lower portion of the latter, said auxiliary reservoir having an opening therein communicating with the interior of said bellows, and a disc valve mounted in said auxiliary reservoir and adapted to close said opening, the air pressure in said auxiliary reservoir being increased upon the compression of said bellows and prevented from reduction by the closing of said disc valve upon expansion of said bellows.

20. A pneumatic suspension for vehicles and the like comprising a flexible bellows having portions connected respectively with the chassis and wheel and adapted to receive air under pressure, a reservoir mounted exteriorly of said bellows and adapted to receive air under pressure, a conduit connecting the interior of said bellows with the interior of said reservoir, a valve member movably mounted between said bellows and reservoir and adapted to control the flow of air through said conduit, an oscillatory member for controlling the movement of said valve member, said oscillatory member being normally positioned for engagement with said valve member upon the compression of said bellows to thereby maintain unrestricted communication between said bellows and reservoir whereby relative movement of said chassis and wheel toward each other is increasingly resisted by reason of the building up of pressure, said valve member being moved out of engagement with said oscillatory member on the expansion of said bellows and to a position in which communication between said bellows and reservoir is effectively shut off whereby the built-up pressure tends to resist the rebound movement of said chassis and wheel, an auxiliary reservoir at the wheel end of said bellows and disposed therein, said auxiliary reservoir being provided with an opening through which air may pass, and a disc valve mounted in said auxiliary reservoir and adapted to control the flow of air therethrough, the air being introduced into the auxiliary reservoir during the compression of the bellows and at high pressure, said disc valve closing said opening during the expansion of said bellows to maintain the air therein, and means for by-passing a small quantity of air around said disc valve.

21. A pneumatic suspension system for a vehicle having a rigid body structure and a plurality of wheels, said system comprising spaced suspension units to support the body structure relative to said wheels, each of said units comprising a pneumatic cushioning device connected between said body structure and a wheel, a reservoir for said cushioning device, a fluid conduit connecting said cushioning device with its reservoir, means responsive to differential fluid pressure between said cushioning device and said reservoir to control said differential pressure, and means normally preventing said pressure responsive means from functioning, but responsive to acceleration and angular movement of said body structure to permit said pressure responsive means to function.

22. A pneumatic suspension system for a vehicle having a rigid frame and a running gear with a plurality of wheels, said system comprising a plurality of pneumatic cushioning devices connected between said frame and said wheels at a plurality of separated points on said frame, a reservoir for each cushioning device, respective fluid conduits between the cushioning devices and their reservoirs, means responsive to higher pressures in said cushioning devices than in said reservoirs adapted to close communication between said cushioning devices and their respective reservoirs under certain conditions, and means responsive to acceleration in a horizontal plane and angular movement of said body to establish said conditions.

23. The pneumatic suspension system as set forth in claim 21 in which the pressure responsive means is responsive to a higher pressure in the reservoir than in the cushioning device to place a restriction on the flow of fluid pressure from the reservoir to the cushioning device.

24. In a pneumatic suspension system for a vehicle having a rigid frame and a plurality of wheels, the combination of respective pneumatic cushioning devices connected between said frame and said wheels at spaced points on said frame, a reservoir for each of said cushioning devices, fluid connections between said cushioning devices and their respective reservoirs, means in said connections responsive to differential pressures in said cushioning devices and said reservoirs adapted to prevent free flow of fluid from a cushioning device to its respective reservoir under certain conditions while permitting only a restricted flow in the opposite direction, and means responsive to acceleration of said vehicle to establish said conditions.

25. A vehicle suspension system for resiliently supporting a rigid body on a running gear that has a plurality of wheels which are adapted to travel over a road bed having an irregular surface, said system comprising a plurality of pneumatic cushioning devices for supporting said body relative to said wheels, a reservoir for each of said cushioning devices, a conduit connecting each of said devices with its respective reservoir, and means associated with said conduit responsive to acceleration of said vehicle to alter the compression rate of said cushioning device without affecting the recovery rate of said device.

26. A vehicle suspension system for resiliently supporting a rigid body on a running gear having a plurality of wheels adapted to travel over an irregular road bed, said system comprising a plurality of relatively spaced pneumatic cushioning devices to support the body relative to said wheels, each cushioning device comprising means responsive to acceleration of said vehicle in a horizontal plane to alter its rate of compression without affecting the rate of recovery thereof.

27. A pneumatic suspension system for a vehicle having a rigid frame and a plurality of wheels, said system comprising respective pneumatic cushioning devices connected between said frame and each of said wheels at separated points on said frame, a reservoir for each of said cushioning devices, a fluid conduit connecting each of said cushioning devices with its respective reservoir, means responsive to differential pressure between each cushioning device and its respective reservoir to control said differential pressure, means normally preventing said pressure responsive means from operating, but responsive to acceleration of the vehicle in the horizontal plane to permit it to operate, the said acceleration responsive means on the opposite sides of said vehicle being responsive to accelerations in the same direction longitudinally of said vehicle, while being responsive only to acceleration in opposite directions transversely of said vehicle.

28. A pneumatic suspension system for a vehicle having a rigid frame and a plurality of wheels, said system comprising respective pneumatic cushioning devices connected between said frame and each of said wheels at separated points on said frame, a reservoir for each of said cushioning devices, a fluid conduit connecting each of said cushioning devices with its respective reservoir, means responsive to differential pressure between each cushioning device and its respective reservoir to control said differential pressure, means normally preventing said pressure responsive means from operating, but responsive to acceleration of the vehicle in the horizontal plane to permit said means to operate, at least one of said acceleration responsive means on one side of said vehicle being adapted to close communication from associated pneumatic cushioning device to its associated reservoir, while one of the pressure responsive means on the opposite side of said vehicle is free to control the flow of fluid from the reservoir to its associated cushioning device when the vehicle drives through a curve.

29. A pneumatic suspension system for a vehicle having a rigid frame and a plurality of wheels, said system comprising respective pneumatic cushioning devices connected between said frame and each of said wheels, at separated points on said frame, a reservoir for each cushioning device, a fluid conduit connecting each of said cushioning devices with its associated reservoir, valve means having two alternative operative positions, an inertia controlled member adapted normally to prevent said valve means from moving to one operative position but responsive to acceleration of the vehicle in a horizontal plane to allow said valve means to move to said operative position.

30. A pneumatic suspension for vehicles and the like comprising a flexible, fluid-retaining chamber having one end connected to the chassis of the vehicle and the other end connected to a wheel thereof, said flexible chamber having a constricted portion intermediate the ends thereof, and a girdle ring positioned about said constricted portion having an outer peripheral surface reversely curved radially outwardly and toward the central plane of said constricted portion whereby the compression rate of said container is varied from a linear relation.

31. In a suspension for a vehicle having a rigid frame and at least one wheel on each side of said frame individually resiliently connected thereto, the combination of a spindle for each of such wheels mounted for independent relative movement, a pneumatic cushioning device adapted to resiliently oppose such relative movement, a reservoir in communication with said cushioning device, and means interposed between said cushioning device and said reservoir responsive to acceleration of said vehicle in the horizontal plane to control the rate of compression of said cushioning device.

32. In a suspension for a vehicle having a rigid frame or body and at least one wheel on the opposite sides of said body individually resiliently connected thereto, a spindle for each of such wheels mounted for independent relative movement, a pneumatic cushioning device adapted to resiliently oppose such relative movement, a reservoir in communication with each of said cushioning devices, means responsive to higher pressures in said cushioning device than in said reservoir to normally close communication between said cushioning device and said reservoir, and means responsive to acceleration of said vehicle in the horizontal plane to prevent the normal operation of said pressure responsive means.

33. A pneumatic suspension system for a vehicle having a rigid body structure and a plurality of wheels, said system comprising a plurality of pneumatic cushioning devices each connected between said frame and a wheel at separated points on said body structure, a reservoir for each of said cushioning devices, a fluid conduit between each of said cushioning devices and its respective reservoir, means responsive to a differential pressure between each cushioning device and its respective reservoir to control said differential pressure, means normally preventing said pressure responsive means from operating, but responsive to acceleration to said body structure in the horizontal plane to permit said named means to operate, and a second reservoir connected with the interior of said cushioning device.

34. A pneumatic suspension system for a vehicle having a rigid body structure and a plurality of wheels, said system comprising a pneumatic cushioning device connected between said frame and each of said wheels at separated points on said body structure, a reservoir for each of said cushioning devices, a fluid conduit between each cushioning device and its respective reservoir, means responsive to a differential pressure between said cushioning devices and their respective reservoirs to control said differential pressure, a second reservoir for each of said cushioning devices, a fluid conduit between each said second reservoir and its associated cushioning device, and means in each of said conduits for permitting substantially unrestricted flow of fluid from each cushioning device to its associated second reservoir, but permitting only restricted flow in the opposite direction.

35. A pneumatic suspension system for vehicles, said system comprising a resilient cushion formed with a constricted, cylindrical mid-portion, and circumferential end portions of larger size and arcuate cross-section united therewith, and a floating girdle ring mounted upon said cylindrical portion, said ring having an outer peripheral surface that is reversely curved radially outwardly, from each end of the ring toward the central plane thereof, whereby upon relative movement of the ends of the bellows toward each other said arcuate portions of the cushion progressively engage said reversely curved surface of said girdle ring.

36. A pneumatic suspension system for wheeled vehicles, said system comprising pneumatic cushioning devices between the vehicle body and the wheels thereof, and means for changing the compression rate of the respective cushioning devices, said means being responsive to change in the rate of speed of the vehicle to effect a differential rate of compression in the devices that are spaced longitudinally of the vehicle, and responsive to transverse accelerations and angular movement of the vehicle body to effect a differential rate of compression in the devices that are spaced transversely of the vehicle.

37. A vehicle comprising a rectangular frame or body, ground engaging members at the corners thereof, and pneumatic cushioning devices between said frame or body and the respective ground engaging elements, each of said cushioning devices comprising a flexible fluid container, a reservoir, a conduit connecting the container with the reservoir, means in said conduit controlling the flow of fluid between the container and reservoir, means operatively connected with the cushioning devices on the front of the vehicle responsive to deceleration of the vehicle in forward direction for permitting the operation of the fluid control means of said devices, and means operatively connected with the cushioning devices on the rear of the vehicle responsive to acceleration of the vehicle in a forward direction for permitting operation of the fluid control means of said devices, said acceleration and deceleration responsive means on the same side of the vehicle being also responsive to acceleration in the same direction transversely of the vehicle, the acceleration and deceleration responsive means on the opposite side of the vehicle being responsive to transverse acceleration in the same direction, but in reverse direction to those on the other side of the vehicle.

38. A valve structure adapted to be operatively interposed between a flexible bellows and a reservoir for fluid in a pneumatic suspension for vehicles, said valve structure comprising an oscillatory member that is universally angularly movable, and a check valve controlled thereby, said check valve controlling the flow of fluid between bellows and reservoir and openable to permit the flow of fluid from the bellows to the reservoir when the oscillatory member is in a position of rest and in determinate angles of oscillation, and closable to obstruct the flow of fluid from the bellows to the reservoir when the oscillatory member is oscillated to other angular positions.

39. A valve structure adapted to be operatively interposed between a flexible bellows and a reservoir for fluid in a pneumatic suspension for vehicles, said valve structure comprising an oscillatory member mounted for universal angular movement, a check valve controlled thereby, said check valve controlling the flow of fluid between the bellows and reservoir and openable to permit the flow of fluid from bellows to reservoir when the oscillating member is in a position of rest and in determinate positions of oscillation, and closable to obstruct the flow of fluid from bellows to reservoir when the oscillatory member is oscillated to other angular positions, and means for limiting the extent of oscillation of said member at least in one direction.

40. In a valve structure of the character described, the combination of a casing, a pendulum mounted for universal angular movement therein, a check valve for fluid pressure controlled by the said pendulum, and means engageable with the bob of the pendulum for limiting the angular movement thereof at least in one direction.

41. In a valve structure of the character described, the combination of a tubular casing, a pendulum mounted for universal angular movement therein, a check valve for fluid pressure controlled by the angular position of said pendulum, and a chorded bar in the casing adapted to limit the pendulous movement of the pendulum in one direction.

42. In a valve structure of the character described, the combination of a pendulum mounted for universal angular movement, a check valve for fluid pressure movable toward and away from said pendulum, and means on the check valve adapted to engage with the pendulum when the latter is in determinate angular positions for limiting the movement of the check valve toward the pendulum.

43. In a valve structure of the character described, the combination of a pendulum mounted for universal angular movement, a floating check valve for fluid pressure movable toward and away from said pendulum, said check valve being disposed in axial alignment with the pendulum when the latter is in a position of rest, and an axially disposed, asymmetrical structure on said check valve adapted to engage with said pendulum, to limit the movement of the check valve toward the pendulum, when the latter is in certain determinate angular positions of oscillation.

44. A combination as defined in claim 43 including guide means for the check valve preventing angular movement thereof.

45. In a valve structure of the character described, the combination of a hollow casing, a pendulum mounted for universal angular movement therein, a check valve controlled by angular movement of said pendulum, said casing being so constructed as to limit the pendulous movement of the pendulum, and means for suppressing the sound of the impact of the pendulum against the casing.

46. In a valve structure of the character described, the combination of a hollow casing, a pendulum mounted for angular movement therein, a check valve controlled by angular movement of said pendulum, said casing being so constructed as to limit the pendulous movement of the pendulum, and a cushion of resilient rubber composition carried by the pendulum for cushioning the impact of the latter against the casing.

47. A valve structure adapted to be operatively interposed between a flexible bellows and reservoir for fluid in a pneumatic suspension for vehicle, said valve structure comprising a valve seat, a movable valve member of low mass adapted for high frequency operation under a velocity head of fluid, and an oscillatory member adapted to prevent the seating of said valve member under certain conditions of oscillation and to permit the seating of the valve member under other conditions of oscillation.

48. In a valve structure of the character described, the combination of a pair of vertically spaced apart valve seats, a valve member therebetween engageable alternatively therewith and normally resting by gravity on the lower valve seat, said valve member being of low mass and adapted for high frequency operation under a velocity head of fluid, and an oscillatory member controlling the seating of the valve member upon the upper valve seat.

49. In a valve structure of the character described, the combination of a casing, a pair of vertically spaced apart valve seats therein, a valve member therebetween engageable alternatively therewith and normally resting by gravity on the lower valve seat, said valve member being of low mass and adapted to be lifted toward the upper valve seat by a velocity head of fluid, and an oscillatory member adapted to prevent the seating of the valve member on the upper valve seat under certain conditions of oscillation and to permit the seating of the valve member under other conditions of oscillation, said casing being formed with a chamber between said valve seats and outwardly of the valve member to permit the passage of fluid around said valve member when the latter is unseated.

50. In a valve structure of the character described, the combination of a casing, a pair of vertically spaced apart valve seats therein, a valve member therebetween engageable alternatively with said valve seats, said valve member being exposed to a velocity head of fluid from opposite directions and being of low mass so as to be subject to high frequency operation thereby, and an oscillatory member controlling the seating of the valve member upon the upper valve seat, said casing being formed with low capacity by-passes for permitting fluid slowly to pass the valve member when the latter is seated on the lower valve seat.

51. A valve structure of the character described comprising a casing formed with a vertical axial passage therethrough, an annular cap on the lower end of said casing, respective spaced apart valve seats formed on said casing and cap concentrically of said passage, a chamber formed in the casing and cap between said valve seats and opening onto the said passage, a full-floating valve between said valve seats and engageable alternatively therewith under a pressure head of fluid in said passage, and a plurality of screws securing said cap to said casing, said screws being exposed in said chamber and constituting guide means for preventing lateral movement of the valve.

52. A pneumatic suspension for a vehicle having a body or frame structure and running gear, said suspension comprising a unitary, generally tubular flexible casing adapted for holding fluid pressure formed with at least two bulbous, convex portions connected by a restricted intermediate portion of substantial length, and adapted to be interposed between said running gear and the body or frame in such a manner that the load is supported serially by both of said bulbous, convex portions, the relative length of the restricted intermediate portion and the axial extent of said bulbous portions being such that upon compression of said container, substantially uniform flexing of the bulbous, convex portions takes place in such a manner that portions of the bulbous, convex portions axially overlap said restricted intermediate portion progressively from the ends thereof.

53. A pneumatic suspension for a vehicle having body or frame structure and running gear, said suspension comprising a deformable, unitary, generally tubular, flexible casing adapted for holding a compressible fluid under pressure, said casing normally having annular cross-sections throughout and having a restricted, intermediate, radially inextensible portion of substantial length and arcuate convex portions extending axially on either side of said restricted intermediate portion; said convex portions terminating in circumferentially inextensible ends having diameters less than the normal outside diameter of said convex portions; means for operatively associating the ends of said casing with said frame or body and said running gear to support the load serially therebetween; means extending from the region contiguous with said ends having surfaces convex toward the convex portions of said casing and so constructed and arranged as to engage said convex portions during axial compression of said casing whereby flexing of the wall of said casing contiguous to the point of attachment to the parts of the vehicle is prevented and whereby the length of the convex portions which is free to flex under the influence of the internal fluid pressure is progressively reduced and the curvature of the casing wall is gradually and progressively changed from convex transversely to convex axially of said casing; the relative length of said intermediate portion and the axial extent of said convex portions being such that upon compression of said casing the convex portions axially overlap said restricted portion progressively from the ends thereof.

54. A pneumatic suspension for a vehicle having body or frame structure and running gear, said suspension comprising a deformable, unitary, generally tubular, flexible casing adapted for holding a compressible fluid under pressure, said casing normally having annular cross-sections throughout and having a restricted, intermediate, radially inextensible portion and arcuate convex portions extending axially on either side of said restricted intermediate portion; said convex portions terminating in circumferentially inextensible ends having diameters less than the normal outside diameter of said convex portions; means for operatively associating the ends of said casing with said frame or body and said running gear to support the load serially therebetween; means extending from the region contiguous with said ends having surfaces convex toward the convex portions of said casing and so constructed and arranged as to engage said convex portions during axial compression of said casing whereby flexing of the wall of said casing contiguous to the point of attachment to the parts of the vehicle is prevented and whereby the length of the convex portions which is free to flex under the influence of the internal fluid pressure is progressively reduced and the curvature of the casing wall is gradually and progressively changed from convex transversely to convex axially of said casing.

ROY W. BROWN.